US010997544B1

(12) United States Patent
Bar-Zeev et al.

(10) Patent No.: US 10,997,544 B1
(45) Date of Patent: May 4, 2021

(54) DELIVERY LOCATION IDENTIFIERS

(71) Applicant: Amazon Technologies, Inc., Seattle, WA (US)

(72) Inventors: Avi Bar-Zeev, Oakland, CA (US); Brian C. Beckman, Newcastle, WA (US); Steven Gregory Dunn, Bothell, WA (US); Atishkumar Kalyan, Seattle, WA (US); Amir Navot, Seattle, WA (US); Frederik Schaffalitzky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 15/587,334

(22) Filed: May 4, 2017

Related U.S. Application Data

(63) Continuation of application No. 14/567,211, filed on Dec. 11, 2014, now abandoned.

(51) Int. Cl.
*G06Q 10/08* (2012.01)
*B64C 39/02* (2006.01)
*B64F 1/18* (2006.01)
*G06K 19/06* (2006.01)

(52) U.S. Cl.
CPC ......... *G06Q 10/083* (2013.01); *B64C 39/024* (2013.01); *B64F 1/18* (2013.01); *B64C 2201/128* (2013.01); *G06K 19/06037* (2013.01)

(58) Field of Classification Search
CPC . G06Q 10/08; B64F 1/18; B64F 1/007; B64F 1/20; B64C 2201/128; G06K 19/06037; G06K 19/04; G06K 19/06; G06K 19/08; G08G 5/0069
See application file for complete search history.

(56) References Cited

U.S. PATENT DOCUMENTS 9,164,506 B1   10/2015   Zang
9,221,557 B1   12/2015   Friesel
2004/0256519 A1  12/2004   Ellis et al.
(Continued)

OTHER PUBLICATIONS

B. Yuan and Y. Hao, "A Method of Vision-Based State Estimation of an Unmanned Helicopter," 2010 6th International Conference on Wireless Communications Networking and Mobile Computing (WiCOM), Chengdu, 2010, pp. 1-4, doi: 10.1109/WiCOM.2010. 5600249. (Year: 2010).*
(Continued)

*Primary Examiner* — Scott M Tungate
(74) *Attorney, Agent, or Firm* — Athorus, PLLC

(57) ABSTRACT

Disclosed are methods and systems for delivery of items using an unmanned aerial vehicle ("UAV"). A user may be provided with a delivery location identifier ("DLI") that is to be placed at a delivery location within a delivery destination to identify where a UAV is to position an item as part of a delivery to the delivery destination. For example, the delivery destination may be a user's home. Within the deliver destination of the user's home, the user may select a delivery location, such as a spot in the back yard wherein the UAV is to position the ordered item as part of the delivery. To aid the UAV in navigating to the delivery location, the user places the DLI at the delivery location. The UAV detects the DLI and positions the item at or near the DLI as part of the item delivery.

35 Claims, 14 Drawing Sheets

(56) References Cited

U.S. PATENT DOCUMENTS

| | | | |
|---|---|---|---|
| 2007/0119002 A1 | 5/2007 | Baranoff | |
| 2014/0279668 A1* | 9/2014 | Lievens | G06Q 30/0207 |
| | | | 705/340 |
| 2015/0158599 A1 | 6/2015 | Sisko | |
| 2015/0317597 A1* | 11/2015 | Shucker | G06Q 10/083 |
| | | | 235/375 |
| 2016/0068264 A1* | 3/2016 | Ganesh | G08G 5/0069 |
| | | | 701/2 |
| 2016/0093225 A1* | 3/2016 | Williams | G01C 21/00 |
| | | | 701/17 |
| 2016/0114905 A1* | 4/2016 | Derenick | G06K 9/0063 |
| | | | 701/16 |

OTHER PUBLICATIONS

Shang, Jiajia, and Zhongke Shi. "Vision-based runway recognition for uav autonomous landing." International Journal of Computer Science and Network Security 7.3 (2007): 112-117. (Year: 2007).*

* cited by examiner

DELIVERY LOCATION IDENTIFIERS

PRIORITY CLAIM

This application is a continuation of U.S. application Ser. No. 14/567,211, filed Dec. 11, 2014, entitled "Delivery Location Identifiers For Unmanned Aerial Vehicle Item Delivery," which is incorporated by reference herein in its entirety.

BACKGROUND

Physical delivery of items to user specified delivery destinations has improved dramatically over the years, with some retailers offering next day delivery of ordered items. The final or last mile delivery of physical items to a user specified destination is traditionally accomplished using a human controlled truck, bicycle, cart, etc. For example, a user may order an item for delivery to their home (delivery destination). The item may be picked from a materials handling facility, packed, and shipped to the customer for final delivery by a shipping carrier. The shipping carrier will load the item onto a truck that is driven by a human to the delivery destination and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
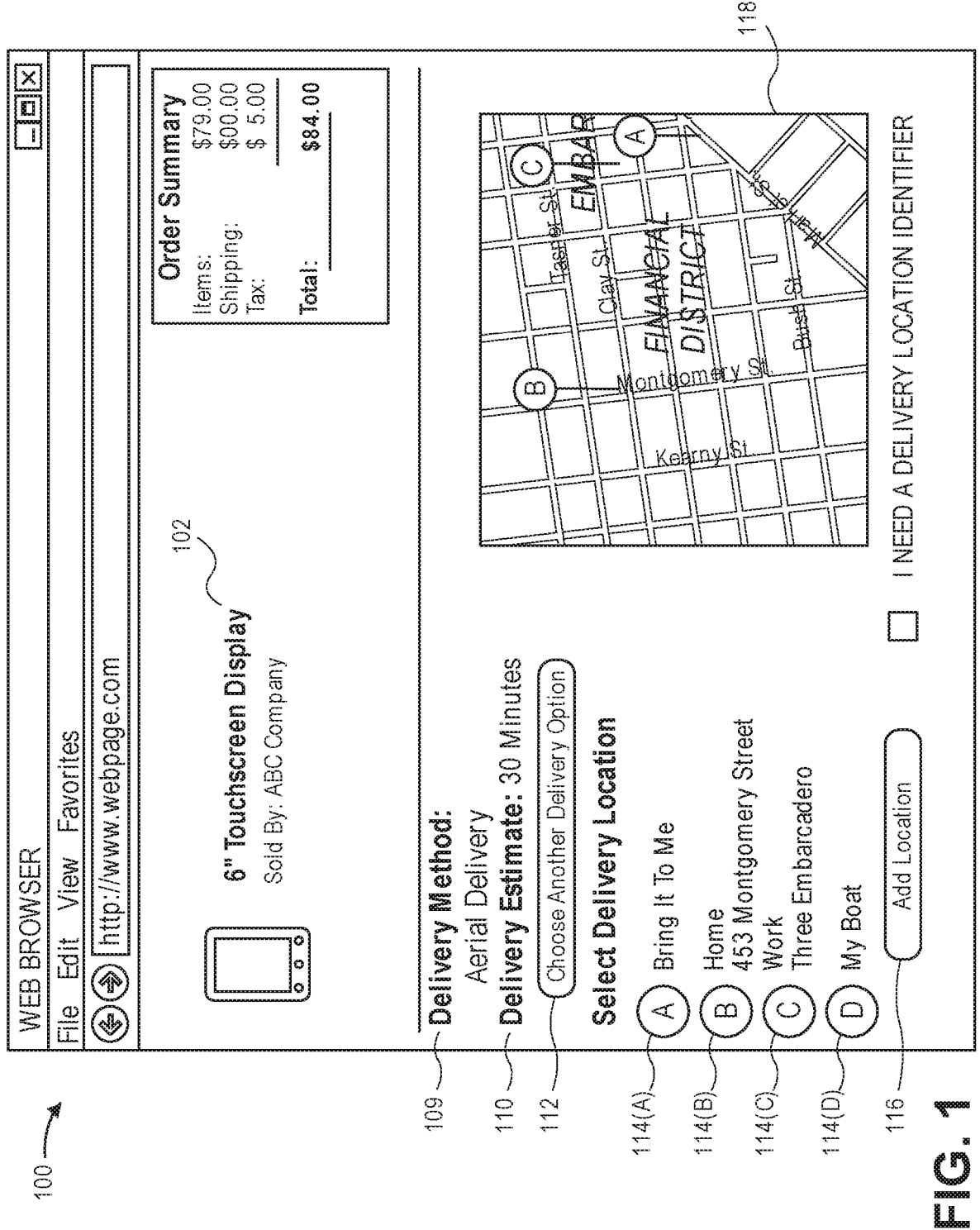
FIG. 1 depicts a graphical user interface for selecting a delivery option for the delivery of an item, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a method and system for delivery of retail items (i.e., an item available for order from a physical or online store or restaurant) or other items to a delivery location identifier ("DLI") using an unmanned aerial vehicle ("UAV"). As discussed in further detail below, a user may be provided with a DLI that is to be placed at a delivery location within a delivery destination to identify where a UAV is to position an item as part of a delivery to the delivery destination. For example, the delivery destination may be a user's home. Within the deliver destination of the user's home, the user may select a delivery location, such as a spot in the back yard wherein the UAV is to position the ordered item as part of the delivery.

To identify the delivery location, the user may physically place a DLI at the delivery location. When the UAV arrives at the delivery destination with the item, it will identify the DLI and position the item at or near the DLI to complete the delivery of the item. In some implementations, rather than, or in addition to physically placing a DLI at a delivery location within the delivery destination, the user may identify a location on a graphical representation of the delivery destination. The selected location on the graphical representation of the delivery destination may be utilized to determine a corresponding physical location (e.g., coordinates) of a delivery location within the delivery destination. When the UAV arrives at the delivery destination, it will utilize the determined physical location to position the item at the delivery location as part of the item delivery.

Utilizing a DLI and/or having a user specify a location on a graphical representation of a delivery destination improves the accuracy and safety of item delivery using a UAV. Likewise, customer satisfaction is improved because items are delivered to a specific, user-specified location within the delivery destination.

As used herein, a "delivery destination" refers to a place or area to which an item is to be delivered. For example, a delivery destination may be a user's home, an area corresponding to a street address, or the like. A "delivery location" refers to a specific location or area within a delivery destination or a portion of a delivery destination. For example, a delivery location may be a location within a user's back yard. Alternatively, the delivery location may be the user's back yard. In some implementations, the delivery location corresponds to the position of the DLI, or a portion of the delivery destination surrounding or adjacent to the position of the DLI.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. Inventory or items may be any physical goods that can be transported using a UAV.

FIG. 1 depicts a graphical user interface 100 for selecting a delivery option for the delivery of an item, according to an implementation. In this example, the user has requested to purchase an electronic device titled "6" Touch Screen Display" 102 sold by ABC Company. As part of the purchase process, the user may select one or more delivery methods that may be used to deliver the selected item. In this example, the user has selected "Aerial Delivery" 109 with a delivery time estimate 110 of 30 minutes. If the user does not desire to receive the item via aerial delivery, the user may choose another delivery option by selecting the "Choose Another Delivery Option" 112 button. In still another implementation, the user may select a delivery time for the aerial delivery. For example, if the user does not desire to receive the item, in this example, in 30 minutes, the user may select another time at which they would like to receive the item.

In addition to selecting a delivery method, the user may choose a delivery destination 114. With the implementations described herein, a user now has the ability to choose "Bring It To Me" 114(A). With this option, the actual location of the user is determined and a defined area around the user may be utilized as the delivery destination. The current location of the user may be based on, for example, a determined location of a portable device (e.g., mobile phone) associated with the user, the location of the network utilized by the user when placing the order, etc. For example, the user may identify their current location by allowing Global Positioning System ("GPS") data to be provided by their mobile device. Alternatively, if the user is connected through a wireless network (e.g., cellular, Wi-Fi, satellite), the location of the network may be determined and used as the delivery destination.

In some implementations, the location of the user may be maintained and updated until the item is delivered to the user. If the current location of the user is determined based on the GPS data from the user's mobile device, the GPS data may be periodically retrieved by the UAV management system (discussed below) and the delivery destination updated as the GPS data changes. For example, the user may place an order for an item while at home, select to have the item delivered to their current location (delivery within 30 minutes of the order), and then leave to go to their friend's house, which is three blocks away from their home. As the ordered item is retrieved from inventory, the current location of the user's mobile device may be determined and the delivery destination correspondingly updated. In this example, the delivery destination will be updated to include the area around the friend's house. As such, the UAV will navigate to the friend's house and determine a delivery location within that delivery destination utilizing one or more of the implementations discussed herein. For example, as the item is arriving at the delivery destination, the user may be notified of the pending arrival. The user may place a DLI at a location within the delivery destination and/or identify a delivery location by interacting with a graphical representation of the delivery destination that is sent to the user. In either case, a delivery location is determined, delivery location information is provided to the UAV, and the UAV positions the item at the determined delivery location within the delivery destination.

In a similar manner, if the user does not desire to have the item delivered to their current location, the user may select another delivery destination either from the list of delivery destinations 114 or the presented map 118. The list of delivery destinations 114 may include other delivery destinations for which the user has received items via delivery from a UAV, other destinations near the user that can receive UAV deliveries, etc.

For example, the user may have previously had an item delivered using a UAV to their home, as illustrated by the home delivery destination option 114(B). Likewise, there may be a delivery destination near the person's place of employment, as illustrated by the work delivery destination option 114(C). Alternatively, the user may have identified another destination for item delivery. In this example, the user has provided information that can be used to determine the current location of the user's boat. The location of the user's boat 114(D) may be determined based on the GPS of the boat and retrieving GPS data from the boat. In still other examples, the user can add other delivery destinations through selection of the "Add Location" button 116 or selecting a location on the map 118.

Upon user selection of a delivery destination, the estimated delivery time may be dynamically updated to reflect the estimated amount of time needed for the UAV to deliver the item to the delivery destination. For example, the user's boat may be physically farther from the source location than the user's home. As such, the delivery estimate time may change. Upon selection of a delivery method and delivery destination, the UAV management system may process the user's order for aerial delivery to the selected delivery destination.

In some implementations, the user may specify whether they need a DLI by selecting the radio button 120 corresponding to the "I Need A Delivery Location Identifier." A DLI may be any physical object that may be positioned at a location within a delivery destination. For example, a DLI may include a visual identifier, a sound identifier, and/or a radio frequency identification ("RFID") tag. As discussed below, in some implementations, the user may create a temporary DLI. For example, the user may be sent an electronic file that includes a representation of a visual identifier. The user may print a physical representation of the visual identifier on a piece of paper using a standard printer, a three-dimension printer (3D printer), etc. In other implementations, the DLI may be an object that is sent to the user. In such an implementation, the DLI may include a visual identifier, a sound identifier, and/or a RFID tag. In some implementations, the DLI may provide both identification and a landing area for the UAV. For example, the DLI may be a large flat surface (e.g., three feet wide, three feet long, and one inch thick) upon which the DLI can land and/or place a package for delivery.

A visual identifier may be any visually identifiable indicator. For example, a visual identifier may be a quick response ("QR") code, a barcode, bokode, character, symbol, color, shape, size, light pattern, etc. A visual identifier may also be presented in any light spectrum that is detectable by a UAV, such as the visible light spectrum, the infrared light spectrum, etc. In some implementations, the visual identifier may be unique to the order, unique to the user, unique to the delivery destination, or any combination thereof.

A sound identifier may be any sound detectable by a UAV. For example, a sound identifier may be a tone, pattern, etc. A sound identifier may be transmitted in any frequency and/or wavelength. For example, a sound identifier may be transmitted between the range of 20 hertz to 20,000 hertz, which is generally detectable by humans and referred to as audible sound. In other implementations, the sound identifier may be transmitted in frequencies that are not generally audible to humans.

A RFID tag generally refers to a device with an antenna or resonator that can produce a wireless signal when activated or powered. The wireless signal produced by the RFID tag is typically low power, and intended for transmission over short distances. For example, a RFID tag may be used to transfer data wirelessly using radio frequency electromagnetic fields. Data transfers occur in the form of modulated signals transmitted between a RFID tag, which may include various communication components, logic, or circuitry, and a RFID reader, which may include antennas or other like devices. Data, such as a RFID tag identifier, stored within a microchip or other storage device associated with the RFID tag may be sent to the RFID reader, which may interpret not only the data received in the RFID tag signal but also other relevant information or attributes of the RFID tag signal, such as an intensity, strength, or a frequency of the RFID tag signal, as well as a direction from which the RFID tag signal originated, a range traveled by the RFID tag signal or at least some of the information or data included in the RFID tag signal.

The transfer of the RFID tag signal is initiated when an electric field or a magnetic field transmitted by a RFID reader is sensed by a RFID tag, which transmits information or data that may be stored in association with the RFID tag in one or more microchips or other storage devices.

An RFID tag may be an active RFID tag in which the RFID tag includes an internal power supply (e.g., battery), a passive RFID tag in which the RFID tag does not include a power supply and is activated by power supplied by a RFID reader, a battery-assisted RFID tag in which the RFID tag includes a power supply (battery) but is activated by power supplied by a RFID reader, an active near field communication ("NFC") tag, a passive NFC tag, a Bluetooth tag, or any other type of tag that can be configured to provide an identifier over a radio frequency.

RFID tag signals may be transmitted from a RFID tag to a RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) and may transmit larger sets or packets of data at ranges of one meter (1 m) or longer.

An RFID reader, as used herein, refers to any type of RFID reader that can power, communicate with, interrogate, and/or receive information from a RFID tag. For example, a RFID reader may be included on a UAV and when the UAV arrives at a delivery destination, it may activate the RFID reader to detect and locate a RFID tag included in a DLI.

While the examples discussed herein describe the delivery of a physical object, a digital item may likewise be delivered using one or more of the implementations described herein. For example, a user may order a digital item (e.g., video, audio, electronic book, map) and request that the digital item be delivered via UAV. Using the implementations discussed herein, the digital item may be stored in memory of the UAV, and the UAV may navigate to a delivery destination, determine the delivery location, and transmit the digital item to the user or a device (e.g., cell phone, tablet, or laptop) of the user. For example, the UAV may join and/or create a wireless network through which the digital item may be transmitted. In one example, the UAV may establish a local wireless network that the user may temporarily join to receive a transmission of the digital item. In another example, the UAV may join an existing wireless network (e.g., the user's Wi-Fi network) and transmit the digital item to the user's device.

Figure 2:
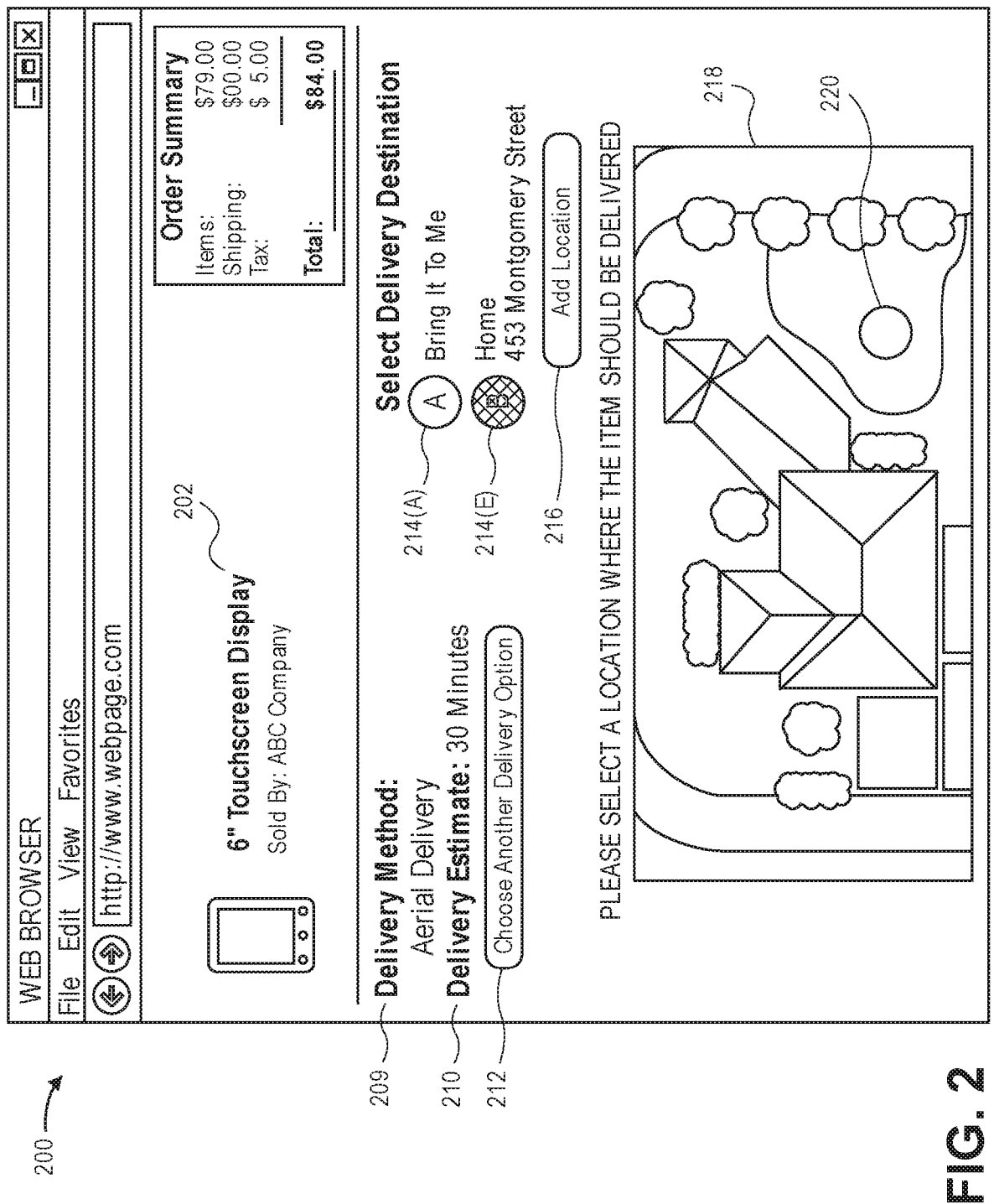
FIG. 2 depicts a graphical user interface for selecting a delivery destination and specifying a delivery location within the delivery destination, according to an implementation.

FIG. 2 depicts a graphical user interface 200 for selecting a delivery destination and specifying a delivery location within the delivery destination, according to an implementation. In this example, similar to the example discussed above with respect to FIG. 1, the user has requested to purchase an electronic device titled "6" Touch Screen Display" 202 sold by ABC Company. As part of the purchase process, the user may select one or more delivery methods that may be used to deliver the selected item. In this example, the user has selected "Aerial Delivery" 209 with a delivery time estimate 210 of 30 minutes. If the user does not desire to receive the item via aerial delivery, the user may choose another delivery option by selecting the "Choose Another Delivery Option" 212 button. In still another implementation, the user may select a delivery time for the aerial delivery. For example, if the user does not desire to receive the item, in this example, in 30 minutes, the user may select another time at which they would like to receive the item.

In addition to selecting a delivery method, the user may choose a delivery destination 214. With the implementations described herein, a user now has the ability to choose "Bring It To Me" 214(A). With this option, the actual location of the user is determined and a defined area around the user may be utilized as the delivery destination. The current location of the user may be based on, for example, a determined location of a portable device (e.g., mobile phone) associated with the user, the location of the network utilized by the user when placing the order, etc. For example, the user may identify their current location by allowing GPS data to be provided by their mobile device. Alternatively, if the user is connected through a wireless network (e.g., cellular, Wi-Fi, satellite), the location of the network may be determined and used as the delivery destination.

In a similar manner, if the user does not desire to have the item delivered to their current location, another delivery destination may be selected from the list of delivery destinations 214 or the user may add a delivery destination by selecting the "Add Location" control 216. The list of delivery destinations 214 may include other delivery destinations for which the user has received items via delivery from a UAV, other destinations near the user that can receive UAV deliveries, etc. For example, the user may have previously had an item delivered using a UAV to their home, as illustrated by the home delivery destination option 214(B).

In this example, the user has selected the home delivery destination option 214(B). Upon selection of a delivery destination, a graphical representation 218 of the selected delivery destination is presented to the user so that the user can identify a delivery location within the graphical representation of the delivery destination 218. In this example, the user has identified a location 220 in the back yard of the graphical representation of the delivery destination 218.

The UAV management system receives the placement of the indicated delivery location 220 on the graphical representation of the delivery destination and determines geographic coordinates corresponding to the location of the delivery location. For example, the graphical representation of the delivery destination may have corresponding geographic coordinates that are used to determine the delivery location.

In some implementations, the UAV management system may pre-process the graphical representation of the delivery destination to determine areas within the delivery destination that are potentially acceptable as delivery locations. For example, the UAV management system may process an image of the delivery destination using object recognition, edge detection, shape recognition, color processing algorithms, etc., to determine objects (e.g., houses, buildings, trees, water, pools, lawns, tables) within the delivery destination. Based on the determined objects, areas that are not suitable for placement of an ordered item and/or landing of a UAV may be determined and designated not suitable as delivery locations. When the graphical representation of the delivery destination is presented to the user, the areas determined not suitable as a delivery location may be greyed out or otherwise indicated as not available for use as a delivery location. Likewise, the UAV management system may suggest or identify areas that are potentially available as delivery locations (e.g., lawn, table, and driveway). In some implementations, the UAV management system may maintain a history of past delivery locations within the delivery destination and suggest those locations to the user for selection.

A user may specify one or more delivery locations by interacting with the graphical representation of the delivery destination 218. For example, if the user is viewing a graphical representation of the delivery location 218 on a device with a touch-based display, the user may identify a delivery location within the graphical representation of the delivery destination by touching desired locations on the touch-based display. Other forms of input (mouse, keyboard, etc.) may likewise be utilized.

Figure 3:
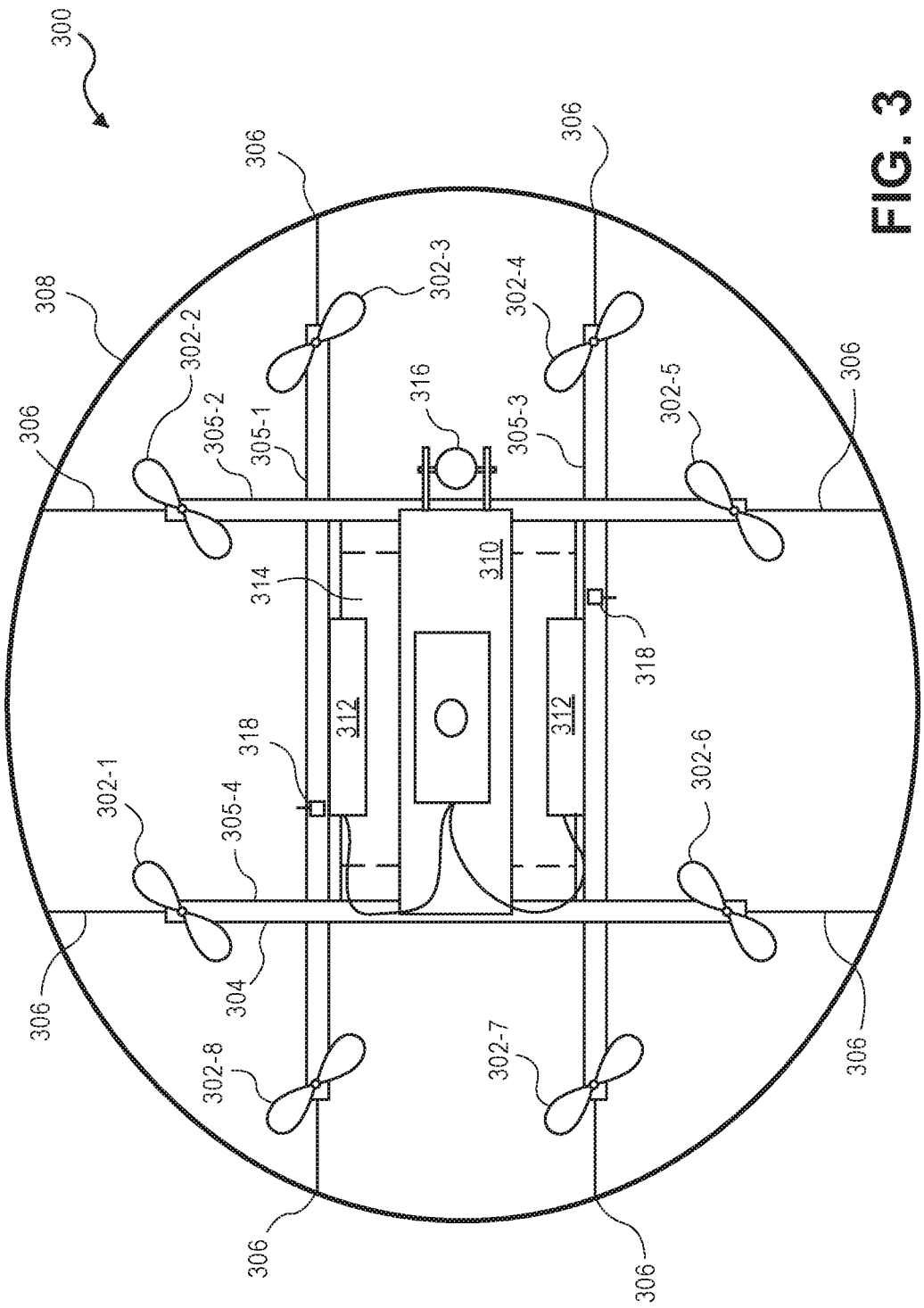
FIG. 3 depicts a block diagram of a top-down view of an unmanned aerial vehicle, according to an implementation.

FIG. 3 illustrates a block diagram of a top-down view of a UAV 300, according to an implementation. As illustrated, the UAV 300 includes eight propellers 302-1, 302-2, 302-3, 302-4, 302-5, 302-6, 302-7, 302-8 spaced about the frame 304 of the UAV. The propellers 302 may be any form of propeller (e.g., graphite, carbon fiber) and of a size sufficient to lift the UAV 300 and any inventory engaged by the UAV 300 so that the UAV 300 can navigate through the air to deliver the item(s) to a delivery destination. While this example includes eight propellers, in other implementations, more or fewer propellers may be utilized. Likewise, in some implementations, the propellers may be positioned at different locations on the UAV 300. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 304 of the UAV 300 may likewise be of any suitable material, such as graphite, carbon fiber, and/or aluminum. In this example, the frame 304 of the UAV 300 includes four rigid members 305-1, 305-2, 305-3, 305-4, or beams arranged in a hash pattern with the rigid members intersecting and joined at approximately perpendicular angles. In this example, rigid members 305-1 and 305-3 are arranged substantially parallel to one another and are approximately the same length. Rigid members 305-2 and 305-4 are arranged substantially parallel to one another, yet perpendicular to rigid members 305-1 and 305-3. Rigid members 305-2 and 305-4 are approximately the same length. In some embodiments, all of the rigid members 305 may be of approximately the same length, while in other implementations, some or all of the rigid members may be of different lengths. Likewise, the spacing and/or orientation between the two sets of rigid members may be approximately the same or different.

While the implementation illustrated in FIG. 3 includes four rigid members 305 that are joined to form the frame 304, in other implementations, there may be fewer or more components to the frame 304. For example, rather than four rigid members, in other implementations, the frame 304 of the UAV 300 may be configured to include six rigid members. In such an example, two of the rigid members 305-2, 305-4 may be positioned parallel to one another. Rigid members 305-1, 305-3 and two additional rigid members on either side of rigid members 305-1, 305-3 may all be positioned parallel to one another and perpendicular to rigid members 305-2, 305-4. With additional rigid members, additional cavities with rigid members on all four sides may be formed by the frame 304. As discussed further below, a cavity within the frame 304 may be configured to include an inventory engagement mechanism for the engagement, transport, and delivery of item(s) and/or containers that contain item(s).

In some implementations, the UAV may be configured to reduce aerodynamic resistance. For example, an aerodynamic housing may be included on the UAV that encloses the UAV control system 310, one or more of the rigid members 305, the frame 304, and/or other components of the UAV 300. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the UAV 300 so that no additional drag is created during transport of the inventory by the UAV 300. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 302 and corresponding propeller motors are positioned at both ends of each rigid member 305. The propeller motors may be any form of motor capable of generating enough speed with the propellers to lift the UAV 300 and any engaged inventory thereby enabling aerial transport of the inventory. For example, the propeller motors may each be a FX-4006-13 740 kv multi rotor motor.

Extending outward from each rigid member is a support arm 306 that is connected to a safety barrier 308. In this example, the safety barrier is positioned around and attached to the UAV 300 in such a manner that the motors and propellers 302 are within the perimeter of the safety barrier 308. The safety barrier may be plastic, rubber, etc. Likewise, depending on the length of the support arms 306 and/or the length, number or positioning of the rigid members 305, the safety barrier may be round, oval, or any other shape.

Mounted to the frame 304 is the UAV control system 310. In this example, the UAV control system 310 is mounted in the middle and on top of the frame 304. The UAV control system 310, as discussed in further detail below with respect to FIG. 13, controls the operation, routing, navigation, communication and the inventory engagement mechanism of the UAV 300.

Likewise, the UAV 300 includes one or more power modules 312. In this example, the UAV 300 includes two power modules 312 that are removably mounted to the frame 304. The power module(s) for the UAV may be in the form of battery power, solar power, gas power, super capacitor, fuel cell, alternative power generation source, or a combination thereof. For example, the power modules 312 may each be an 8000 mAh Lithium Polymer (LiPo) battery. The power modules 312 are coupled to and provide power for the UAV control system 310 and the propeller motors.

In some implementations, one or more of the power modules may be configured such that it can be autonomously removed and/or replaced with another power module while the UAV is landed. For example, when the UAV lands at a relay location and/or materials handling facility, the UAV may engage with a charging member at the location that will recharge the power module. In some implementations, a container may include a power module and when the engagement mechanism of the UAV engages with the container, the power module of the container may provide power to the UAV. For example, when an item is being delivered to a delivery location, the power module included in the container may be utilized to power the UAV, rather than and/or in addition to the power modules 312 of the UAV 300. When the container is disengaged, the power provided by the container is removed and the UAV 300 operates using power from the UAV power module 312.

As mentioned above, the UAV 300 also includes an inventory engagement mechanism 314. The inventory engagement mechanism may be configured to engage and disengage items and/or containers that hold items. In this example, the inventory engagement mechanism 314 is positioned within a cavity of the frame 304 that is formed by the intersections of the rigid members 305. In this example, the inventory engagement mechanism is positioned beneath the UAV control system 310. In implementations with additional rigid members, the UAV may include additional inventory engagement mechanisms and/or the inventory engagement mechanism 314 may be positioned in a different cavity within the frame 304. The inventory engagement mechanism may be of any size sufficient to securely engage and disengage containers that contain inventory. In other implementations, the engagement mechanism may operate as the container, containing the inventory item(s) to be delivered.

In some implementations, the inventory engagement mechanism 314 may include a retractable cable, pulley, or other member that may be extended or lowered from the UAV to place an item or a container containing an item at an inventory location. The inventory engagement mechanism communicates with (via wired or wireless communication) and is controlled by the UAV control system 310.

The UAV 300 may also include one or more input/output components. For example, the UAV may include one or more cameras 316 that may be positioned to view and/or obtain images of delivery destinations, delivery locations, DLIs, etc. For example, the camera 316 may be mounted on a gimbal that can be used to provide two-axis rotation of the camera with respect to the UAV. The camera may be any type of camera, such as a red, green, blue color sending camera, a still camera, a video camera, a stereo imagery camera, etc.

Likewise, the UAV may include one or more RFID reader 618 that may be powered by the power modules 318 to detect RFID tags included in a DLI. Other input/output components that may be included on the UAV 300 include an audio transducer (speaker), microphone, light sensor, etc.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 4:
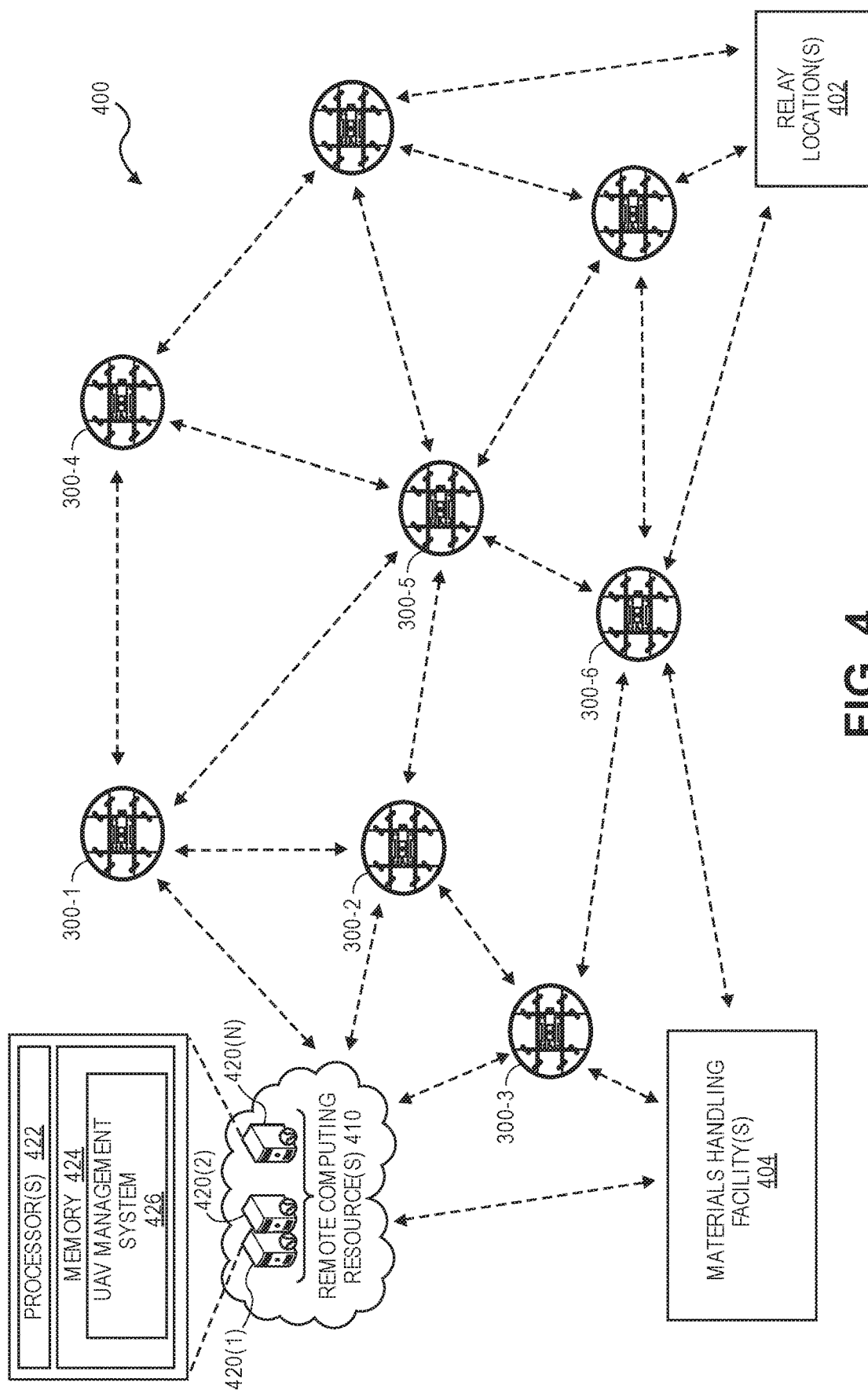
FIG. 4 depicts a diagram of an unmanned aerial vehicle environment, according to an implementation.

FIG. 4 depicts a block diagram of a UAV environment that includes UAVs 300 relay locations 402, materials handling facilities 404 and remote computing resources 410, according to an implementation. Each of the UAVs 300, relay locations 402, materials handling facilities 404 and/or remote computing resources 410 may be configured to communicate with one another. For example, the UAVs 300 may be configured to form a wireless mesh network that utilizes Wi-Fi or another wireless means of communication, each UAV communicating with other UAVs within wireless range. In other implementations, the UAVs 300, UAV management system 426, materials handling facilities 404, and/or relay locations 402 may utilize existing wireless networks (e.g., cellular, Wi-Fi, satellite) to facilitate communication. Likewise, the remote computing resources 410, materials handling facilities 404, and/or relay locations 402 may also be included in the wireless mesh network. In some implementations, one or more of the remote computing resources 410, materials handling facilities 404, and/or relay locations 402 may also communicate with each other via another network (wired and/or wireless), such as the Internet.

The remote computing resources 410 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 410 may include one or more servers, such as servers 420(1), 420(2) . . . 420(N). These servers 420(1)-(N) may be arranged in any number of ways, such as server farms, stacks and the like that are commonly used in data centers. Furthermore, the servers 420(1)-(N) may include one or more processors 422 and memory 424 that may store a UAV management system 426.

The UAV management system 426 may be configured, for example, to communicate with the UAVs 300, materials handling facilities 404, and/or relay locations 402. When a message is sent to or from a UAV, the message may include an identifier for the UAV and each UAV may act as a node within the network, forwarding the message until it is received by the intended UAV. For example, the UAV management system 426 may send a message to UAV 300-6 by transmitting the message and the identifier of the intended receiving UAV to one or more of UAVs 300-1, 300-2, 300-3 that are in wireless communication with the UAV management system 426. Each receiving UAV will process the identifier to determine if it is the intended recipient and then forward the message to one or more other UAVs that are in communication with the UAV. For example, UAV 300-2 may forward the message and the identification of the intended receiving UAV to UAV 300-1, 300-3 and 300-5. In such an example, because 300-3 has already received and forwarded the message, it may discard the message without forwarding it again, thereby reducing load on the mesh network 400. The other UAVs, upon receiving the message, may determine that they are not the intended recipients and forward it on to other nodes. This process may continue until the message reaches the intended recipient.

In some implementations, if a UAV loses communication with other UAVs via the wireless mesh network, it may activate another wireless communication path to regain connection. For example, if a UAV cannot communicate with any other UAVs via the mesh network 400, it may activate a cellular and/or satellite communication path to obtain communication information from the UAV management system 426, materials handling facility 404, and/or relay location 402. If the UAV still cannot regain communication and/or if it does not include an alternative communication component, it may automatically and autonomously navigate toward a designated location (e.g., a nearby materials handling facility 404, relay location 402

The wireless mesh network 400 may be used to provide communication between UAVs (e.g., to share weather information, location information, routing information, landing areas), UAV management system 426, materials handling facilities 404, and/or relay locations 402. Likewise, in some implementations, the wireless mesh network may be used to deliver content to other computing resources, such as personal computers, electronic book reading devices, audio players, mobile telephones, tablets, desktops, laptops, etc. For example, the mesh network may be used to deliver electronic book content to electronic book reading devices of customers. For example, one or more relay locations 402, materials handling facilities 404, the UAV management system 426, and/or UAVs may include a storage medium that contains digital content that may be provided to other computing devices.

Figure 5:
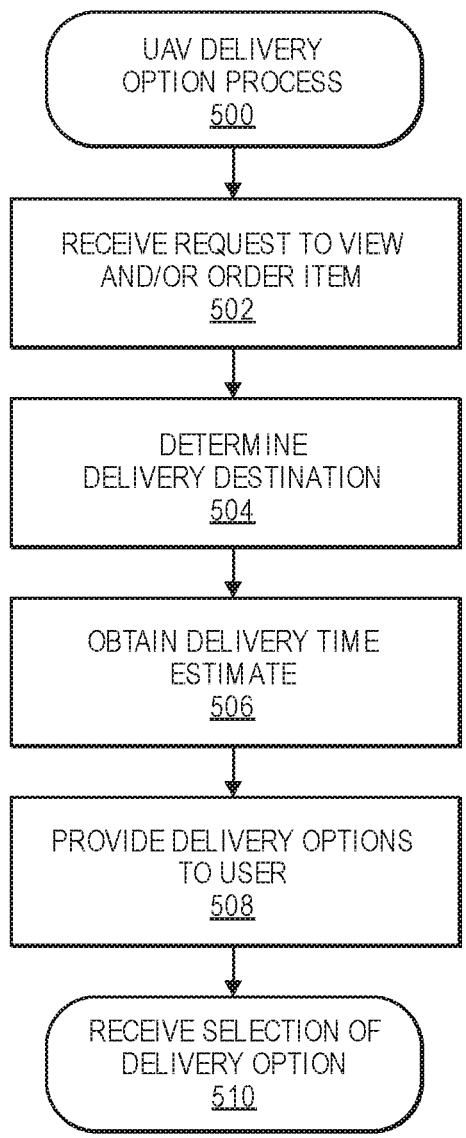
FIG. 5 is a flow diagram illustrating an example process for presenting an unmanned aerial vehicle delivery option for an item, according to an implementation.

FIG. 5 is a flow diagram illustrating an example process 500 for presenting an unmanned aerial vehicle delivery option for an item, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by receiving a request to view and/or order an item for aerial delivery, as in 502. For example, as discussed above with respect to FIG. 1, a user may request to view and/or order an item, such as an electronic device. In response to receiving a request to view and/or order an item for aerial delivery, a delivery destination is determined, as in 504. In some implementations, a delivery destination may be a defined delivery destination associated with a user account of a user that is accessing an e-commerce shopping site. In other implementations, the delivery destination may be determined based on the current location of the user and/or a device associated with the user that requested to view and/or order the item. For example, if the user has identified their portable device as a device that can be used to determine the user's current location, the position (e.g., GPS position) of the portable device may be determined by requesting that the portable device provide position information. In another implementation, the location of the device utilized by the user to request to view and/or order the item may be determined. For example, if the user requested to view and/or order the item using a device that includes a GPS receiver, the GPS coordinates of the device may be included in the request to view and/or order the item. Likewise, if the device is connected to a wireless network (e.g., Wi-Fi, cellular, satellite) the location of the device may be determined and used as the default location. For example, many Wi-Fi networks have been mapped and associated with specific locations. The Wi-Fi network may be identified and the corresponding location determined. In still another example, the user may identify their location.

Based on the determined delivery destination, a delivery time estimate for aerial delivery is determined, as in 506.

Upon determining the delivery time estimate, the example process 500 provides one or more delivery options to the user for selection, as in 508. For example, the user may be presented with an aerial delivery option, which could be as fast as 30 minutes or less, overnight delivery, ground delivery, etc. In response to providing one or more delivery options, the user may select a delivery option and order the item for delivery to a user specified delivery destination, as in 510.

Figure 6:
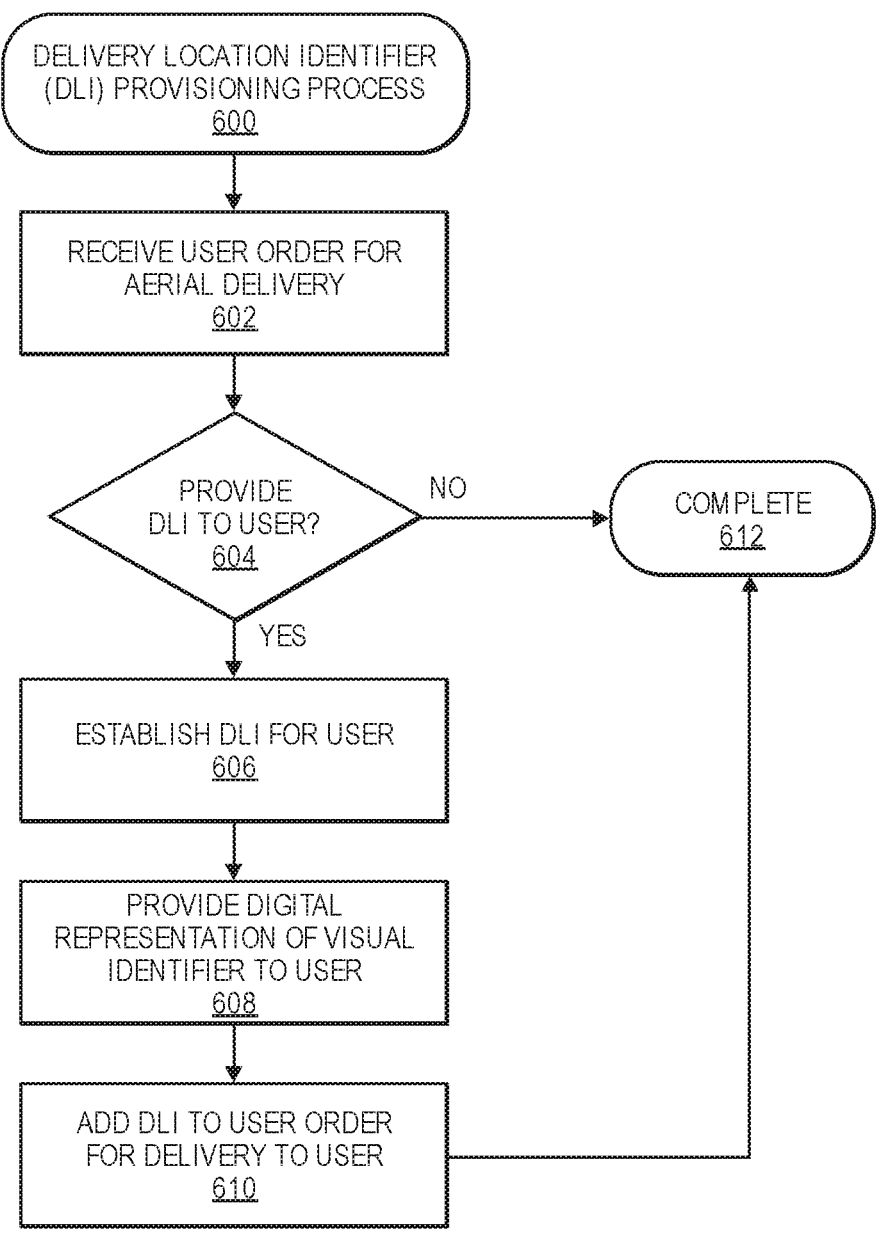
FIG. 6 is a flow diagram illustrating an example delivery location identifier provisioning process, according to an implementation.

FIG. 6 is a flow diagram illustrating an example DLI provisioning process 600, according to an implementation. The example process 600 begins by receiving from a user an order for an item that is to be delivered using a UAV, as in 602. Upon receiving an order from the user, a determination is made as to whether a DLI is to be provided to the user, as in 604. It may be determined that a DLI is to be provided to the user if, for example, the user indicates as part of the order that they need a DLI, as discussed above with respect to FIG. 1. Likewise, the UAV management system may store information identifying whether a DLI has previously been provided to the user that is ordering the item. For example, the UAV management system may maintain a user profile in a user data store 1422 (FIG. 14) that indicates whether a DLI has previously been provided to the user. In still another example, a DLI may not be provided to the user and instead, when the UAV arrives at the delivery destination, an image of the delivery destination may be obtained and sent to the user with a request that the user indicate on the image a delivery location.

In some implementations, the user may select a delivery destination that includes a DLI that may be utilized by more than one person. For example, if the user selects a business address as the delivery destination, a DLI may already be positioned at the business location that may be shared by and available for use by employees of the business.

If it is determined that a DLI is not to be provided to the user, the example process 600 completes, as in 612. However, if it is determined that a DLI is to be provided to the user, a DLI is established, as in 606. Establishing a DLI may include generating a unique identifier that is associated with at least one of the user, the order for the item and/or the delivery destination, generating or associating a visual identifier with at least one of the user, the order and/or the delivery destination, associating a physical DLI with at least one of the user, the order and/or the delivery destination, generating a digital representation of a visual identifier that is part of the DLI, associating a RFID tag with at least one of the user, the order and/or the delivery destination, etc.

The UAV management system may maintain an inventory of physical DLIs and/or an inventory of partially created physical DLIs. For example, the UAV management system may maintain an inventory of DLIs that have perimeter dimensions of approximately twelve inches long, by approximately twelve inches wide, by approximately two inches thick. The DLIs may be formed of any rigid or semi-rigid material, such as metal, plastic, rubber, wood, steel, etc., and may have a total weight of approximately three pounds. The DLIs may be weather resistant and of a defined color, size and/or shape. In some implementations, the DLI may include a Tillable membrane that is empty when transported to reduce the weight of the DLI. When the DLI is to be used by the customer to identify a delivery location, the membrane may be filled with a material (e.g., water, sand, dirt) to increase the weight of the DLI so that it will remain stationary while positioned at the delivery location. Adding weight to the DLI will reduce the likelihood of the DLI moving from a user specified delivery location due to external forces, such as wind. In still another implementation, the DLI may include one or more hooks, loops, or straps that may be secured to a surface to aid in keeping the DLI stationary while placed at a delivery location. In some implementations, the DLI may include a large flat surface that functions as a landing area for a UAV and/or a delivery location upon which an ordered item may be placed by a UAV as part of the delivery. In other implementations, the UAV may be instructed to deliver an ordered item to a location adjacent to the DLI.

In some implementations, the DLI may include a RFID tag, power supply, illumination element, audio transducer, GPS transmitter, and/or other output components that may be used as an identifier for aiding in the location of the DLI by a UAV. The power supply may include solar power, wind power, a battery, etc., that may be used to power the output component(s) of the DLI.

Returning to FIG. 6, in addition to establishing a DLI for the user, a digital representation of a visual identifier may also be provided to the user for the order, as in 608. The digital representation of a visual identifier may include a visual identifier that is part of the DLI or it may be any other visual identifier that associated with the user, the order, and/or the delivery destination. In some implementations, the digital representation of the visual identifier that is provided to the user may be the DLI. The digital representation of the visual identifier may be provided to the user using a variety of techniques. For example, the digital representation of the DLI may be sent to an electronic mail (e-mail) address associated with the user's profile, included in an order confirmation provided to the user, provided for download by the user from, etc.

The established DLI may also be added to or included in the order for the item placed by the user that is to be delivered to the user using a UAV, as in 608. For example, when the item is picked from an inventory location within a material handling facility for delivery, it may be placed into a container that is engaged and transported by a UAV. In such an implementation, the established DLI may also be included in the container for transport and delivery to the user. While this example discusses delivering the DLI using a UAV and as part of an order, in other implementations, the DLI may be transported to the user using traditional delivery methods (e.g., truck, mail), and/or the user may retrieve the DLI from a physical location (e.g., materials handling facility). Likewise, the user may obtain a DLI independent of an order. For example, the DLI may be delivered to the user by a UAV independent of any order for an item.

Figure 7:
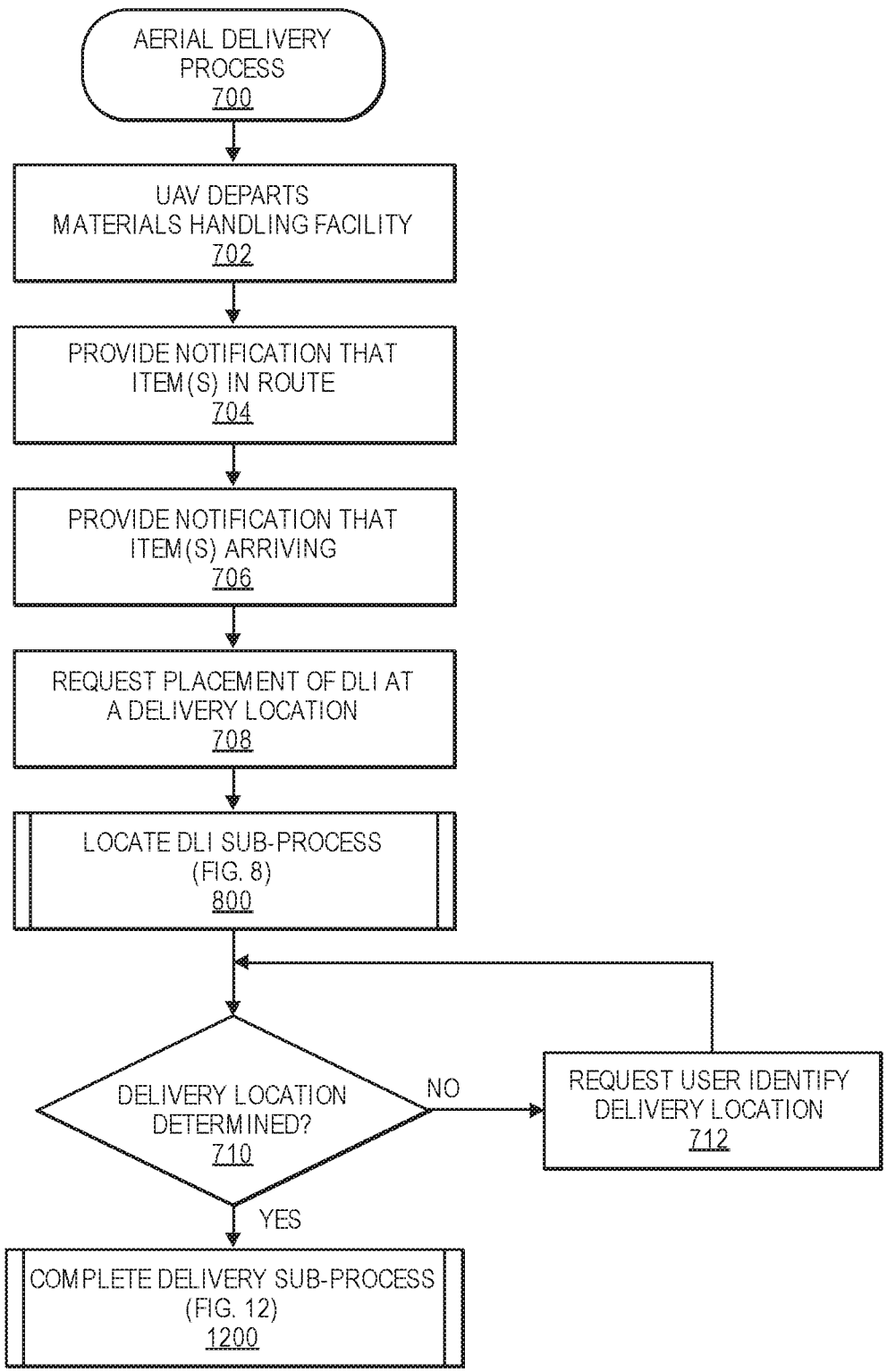
FIG. 7 is a flow diagram illustrating an example aerial delivery process, according to an implementation.

FIG. 7 is a flow diagram illustrating an example aerial delivery process 700, according to an implementation. The example process 700 begins when a UAV departs a materials handling facility to transport an ordered item to a user specified delivery destination, as in 702. The UAV may be provided delivery destination information (e.g., GPS coordinates) that is used to navigate to the delivery destination. Likewise, delivery location information may be provided to the UAV prior to departure from the materials handling facility and/or at any time during the process of delivering the item. For example, delivery location information may be provided to the UAV as the UAV is arriving at the delivery destination.

Upon departing the materials handling facility, a notification may be provided to the user that the ordered item(s) is in route to the delivery destination, 704. For example, an e-mail notification, text-message, short-message, etc. may be sent to the user to notify the user that the ordered item is in route to the user specified delivery destination.

As the UAV arrives at the delivery destination, a second notification may be sent to the user to notify the user that the ordered item is arriving, as in 706. For example, an e-mail notification, text-message, short-message, etc. may be sent to the user to notify the user that the ordered item is arriving at the delivery destination.

As part of one or both of the notifications provided at blocks 704 and 706, and/or as part of a separate message, a request may be provided that the user place a DLI at a delivery location within the delivery destination, as in 708. The DLI may be a DLI that was printed from a digital representation of a DLI that was provided to the user as part of the order. Alternatively, the DLI may be a DLI that has previously been provided to the user. In some implementations, the DLI may already be at a delivery location within the delivery destination and the user can simply ignore the message. Alternatively, the UAV management system may have information identifying that the DLI is already at a user specified delivery location within the delivery destination and may not include and/or send a request that the user place the DLI at a delivery location. For example, in some implementations, the UAV may arrive at the delivery destination, attempt to locate the DLI using the locate DLI sub-process 800 (FIG. 8) and only request that the user place the DLI at a delivery location within the delivery destination if the DLI cannot be located and verified by the UAV.

When the UAV arrives at the delivery destination it initiates the locate DLI sub-process 800 to locate a DLI placed within the delivery destination by the user, as in 800. As discussed below, the example locate DLI sub-process will attempt to locate and verify a DLI within the delivery destination. If a DLI is located and verified, delivery location information, such as coordinates of the DLI are determined and returned to the example process 700. The example locate DLI sub-process is discussed further below with respect to FIG. 8.

Upon completion of the locate DLI sub-process 800, a determination is made as to whether delivery location information was returned, as in 710. If it is determined that the delivery location was not determined, a request may be sent to the user requesting that the user identify a delivery location, as in 712. The request may include a request that the user move outside and stand near the DLI to aid in identification of the DLI by the UAV. Alternatively, a graphical representation of the delivery destination may be sent to the user and the user may specify a delivery location by interacting with the graphical representation of the delivery destination.

Figure 11:
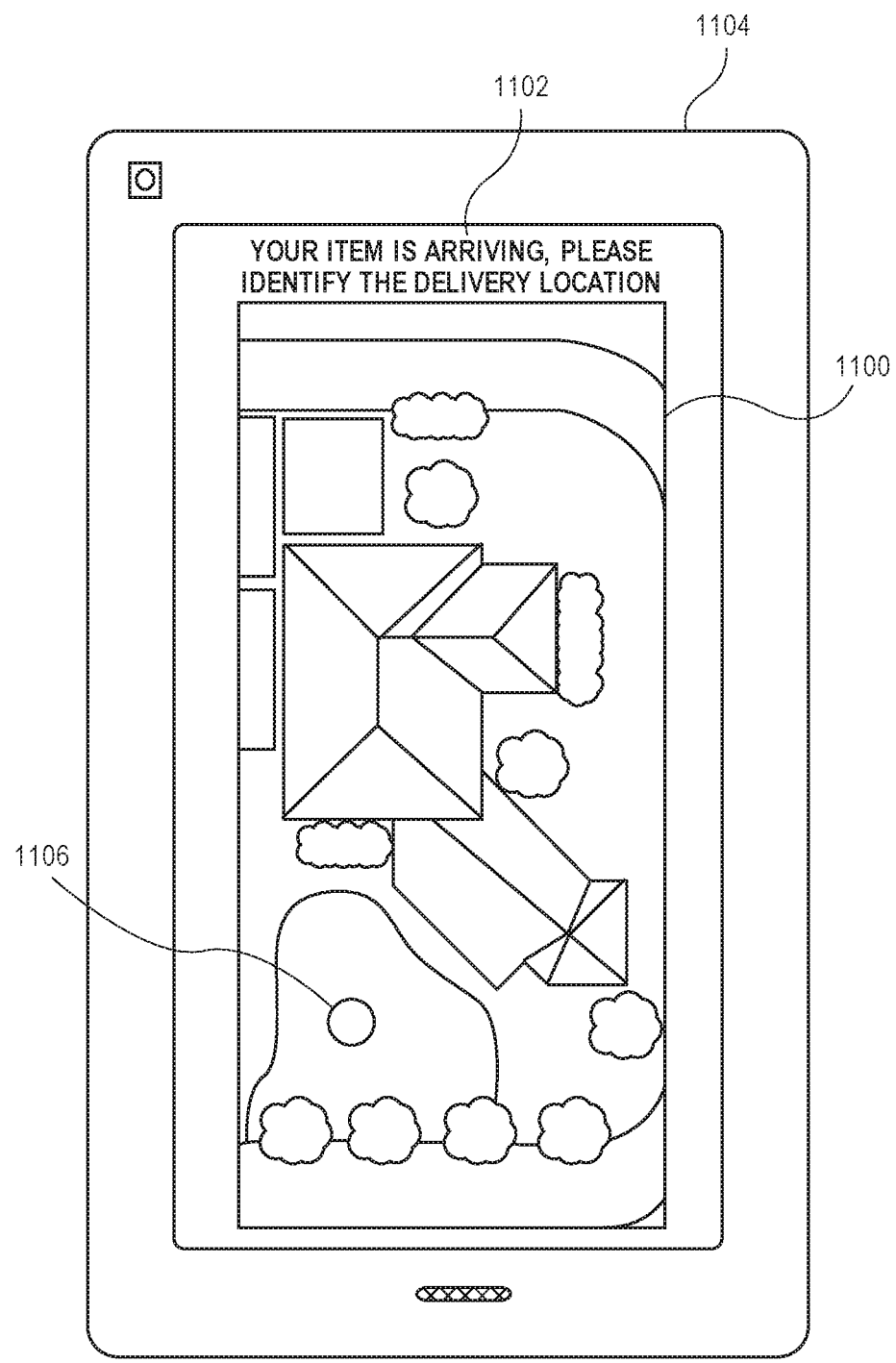
FIG. 11 is a flow diagram illustrating an example sub-process for completing an item delivery, according to an implementation.

For example, referring to FIG. 11, a request that includes graphical representation of the delivery destination, as obtained by the UAV, may be sent to the user along with a request 1102 that the user identify the location of the DLI on the graphical representation of the delivery destination. The request may be presented to the user on an electronic device, such as a portable device 1104, and the user may provide an input 1106 identifying the location of the DLI on the graphical representation of the delivery destination 1100. Upon receiving a response from the user, the example process 700 returns to decision block 710 and continues.

If the user does not respond, the item delivery may be aborted and the UAV instructed to navigate to a defined location (e.g., materials handling facility) without delivering the item. In another implementation, an agent of the materials handling facility may be notified and the agent may control or interact with the UAV to complete the delivery of the item. For example, images and/or video of the delivery destination may be provided from the UAV to an agent and the agent may navigate or confirm a proposed navigation path for positioning the UAV at or over a delivery location within the delivery destination for placement of the item.

In another implementation, if a prior delivery has been completed at the delivery destination using a UAV, the prior delivery location may be selected as the delivery location. In such an implementation, a confirmation may be made that the selected delivery location has not changed since the prior delivery. For example, an image of the selected delivery location may be obtained and compared to a stored image of the delivery location that was obtained as part of the prior delivery. If the objects included in the images are similar, it may be determined that the delivery location has not changed and delivery of the item at the selected delivery location may proceed. Similarity of the images may be determined using image comparison algorithms and/or the images may be manually compared by an agent of the materials handling facility.

If it is determined that the delivery location has been determined, the complete delivery sub-process is performed, as in 1200. The complete delivery sub-process 1200 is discussed below with respect to FIG. 12.

Figure 8:
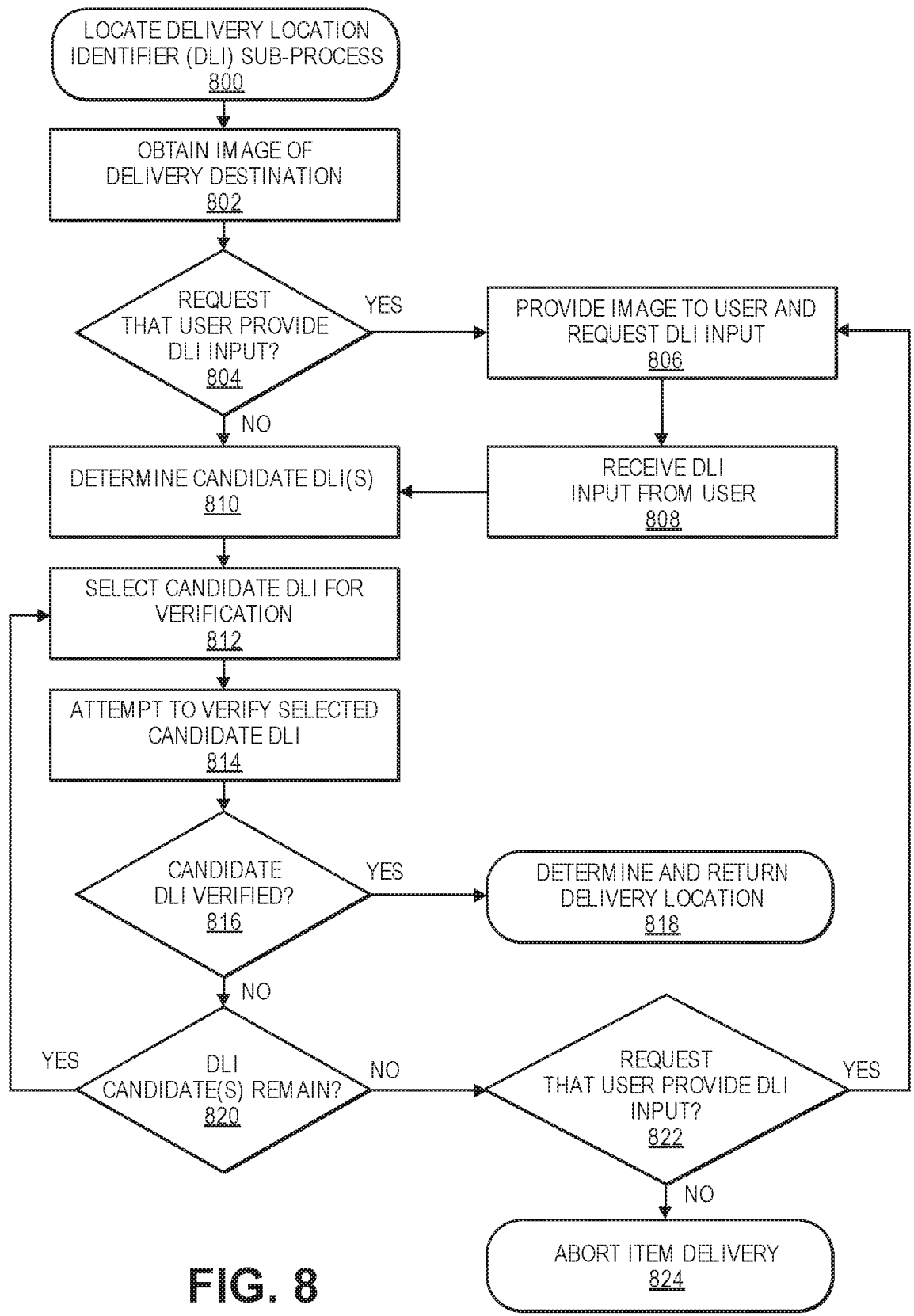
FIG. 8 is a flow diagram illustrating an example sub-process for locating a delivery location identifier, according to an implementation.

FIG. 8 is a flow diagram illustrating an example locate DLI sub-process 800, according to an implementation. The example sub-process 800 begins by obtaining one or more images of the delivery destination, as in 802. The images of the delivery destination may be obtained using a camera of the UAV, using satellite images, obtained from the user, etc. Obtained images may be visual images of the delivery destination, thermal images of the delivery destination, and/or any other type of image that may be obtained and utilized with the implementations discussed herein.

A determination may also be made as to whether a request is to be sent to the user requesting that the user provide DLI input, as in 804. In some implementations, a request may be sent to the user as part of the order process, as discussed above with respect to FIG. 2, and an image of the delivery destination, such as a satellite obtained image, may be included in the request, as in 806. Alternatively, as the UAV arrives at the delivery destination, it may be determined that a request is to be provided to the user. In such an implementation, the request may include an image of the delivery destination obtained by the UAV, as in 806. Utilizing an image from the UAV that is obtained while the UAV is located above the delivery destination is beneficial because the image represents the current environment at the delivery destination.

For example, referring again to FIG. 11, a request that includes graphical representation of the delivery destination 1100, as obtained by the UAV, may be sent to the user along with a request 1102 that the user identify the location of the DLI on the graphical representation of the delivery destination and/or identify a delivery location. The request may be presented to the user on an electronic device, such as a portable device 1104, and the user may provide an input 1106 identifying the location of the DLI on the graphical representation of the delivery destination 1100 and/or identify a delivery location.

A user input or response to the request is received, as in 808. For example, the user may specify on the provided image a delivery location. Alternatively, the user may select an area within the image indicating where the DLI is located at the delivery destination.

After receiving input from the user and/or if it is determined that a request is not to be provided to the user, one or more candidate DLIs are determined, as in 810. Candidate DLIs may be determined by the UAV positioning itself over the delivery destination, obtaining an image of the delivery destination and processing the image to determine candidate DLIs. For example, the UAV may position itself or the UAV management system may instruct the UAV to position itself at an altitude above the delivery destination such that the entire delivery destination is within a field of view of a camera of the UAV. An image of the delivery destination may be then obtained and processed to identify candidate DLIs within the delivery destination.

Candidate DLIs may be determined by processing the image using any one or more of a variety of image processing techniques. For example, if the DLI is of a particular size, shape (e.g., square, round, rectangle, oval) and/or color (e.g., white, black, blue) one or more object detection, edge detection, and/or color recognition algorithms may be utilized to detect objects within the obtained image that are similar to the size, shape and/or color of the DLI. The processing of the image may be performed by the control system of the UAV and/or the image may be sent from the UAV to the UAV management system and processed by the UAV management system.

Figure 9:
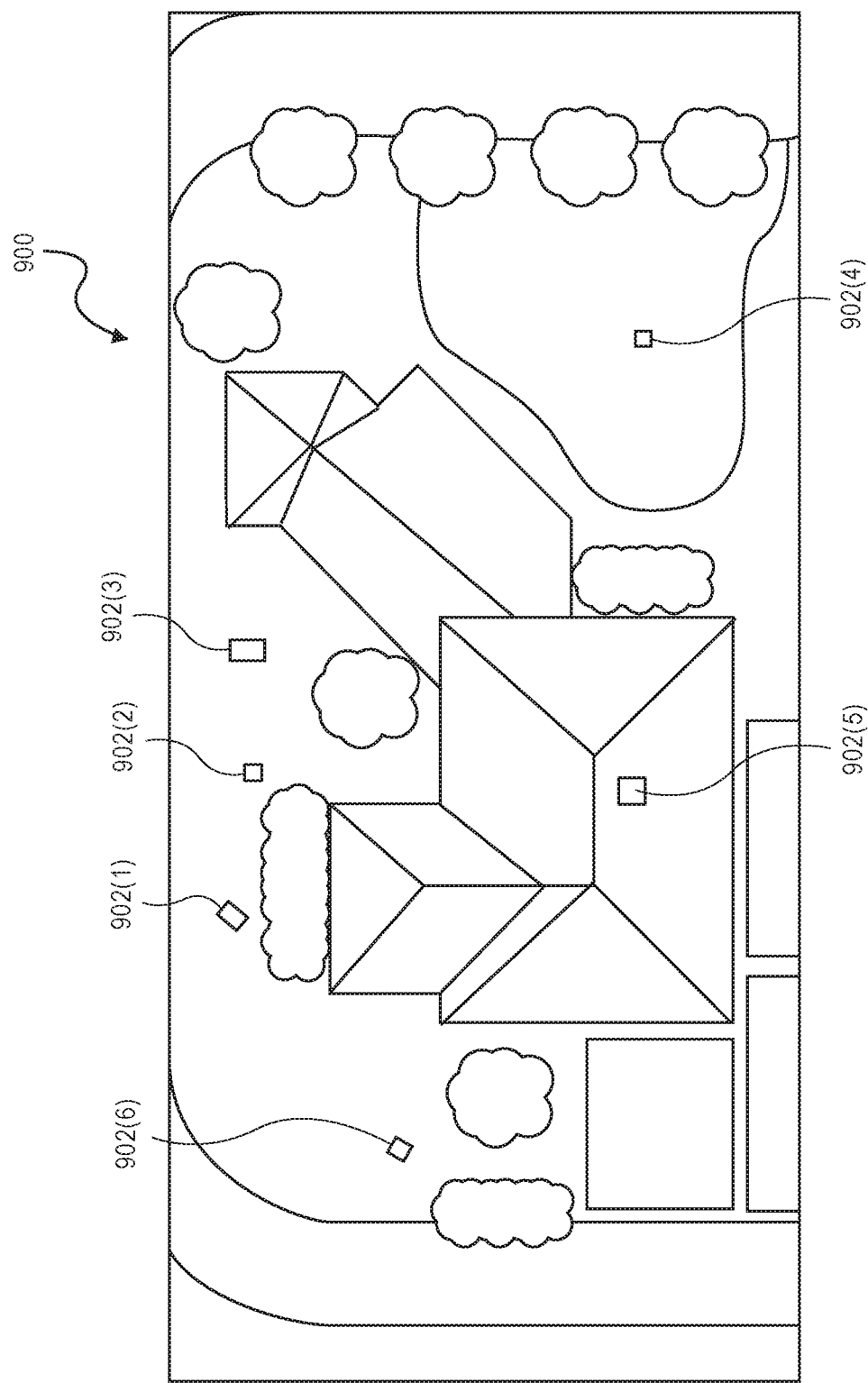
FIG. 9 depicts a block diagram of a top-down view of an image of a delivery destination including candidate delivery location identifiers, according to an implementation.

Turning to FIG. 9, illustrated is a representation of delivery destination 900 obtained by the UAV. The obtained image has been processed to identify candidate DLIs 902 based on a known size, shape, and color of the DLI. In this example, the DLI is approximately twelve inches, by twelve inches, square and white in color with a black visual identifier that is unique to the user printed on the top of the DLI.

Based on the combination of the known size, shape and color, candidate DLIs 902 can be quickly identified from other objects at the delivery destination. In this example, edge detection, object detection, and/or color detection algorithms may be used to identify objects included in the obtained image. Based on the known altitude of the UAV and the known focal length of the lens of the camera on the UAV, an approximate size of the determined objects can also be determined. Utilizing the known, size, shape, and color, candidate objects can be quickly identified from the image. In this example, six candidate DLIs 902(1), 902(2), 902(3), 902(4), 902(5) and 902(6), all of which have a four-sided shape, are within a defined threshold of the known size of the DLI and are within a defined color range of the known color of the DLI.

Returning to FIG. 8, upon determining candidate DLIs, a candidate DLI is selected for verification, as in 812. In some implementations, candidate DLIs may be ranked on the likelihood that they are the DLI and the highest-ranking candidate DLI may be selected for attempted verification as the DLI. For example, based on the known size, shape and/or color of the DLI, the candidate DLIs may be ranked based on how similar the representation in the image of the candidate DLI is to the known size, shape, and/or color of the DLI. In some implementations, other factors may also be considered in ranking candidate DLIs. For example, if a prior delivery has been completed to the delivery destination using a UAV, the delivery location within the delivery destination used for the prior delivery is maintained by the UAV management system. The location of candidate DLIs from the known prior delivery location may be a factor in ranking the candidate DLIs. For example, the candidate DLI that is closest to the location of the prior delivery may be ranked higher than candidate DLIs that are farther away from the prior delivery location.

In another example, if the user has provided an input identifying the delivery location on a graphical representation of the delivery destination, as illustrated in FIGS. 2 and 11, the provided input may be used to rank candidate DLIs that are closer to the user provided input higher than candidate items that are father away.

In still another example, the location of candidate DLIs with respect to other objects determined in the obtained image may also be considered in raking the candidate DLIs. For example, if there are multiple objects near a candidate DLI, the DLI may be given a lower rank than a candidate DLI that is not located near other objects.

Upon selection of a candidate DLI, the example process attempts to verify the candidate DLI as the DLI associated with at least one of the user, the order, and/or the delivery destination, as in 814. For example, if the DLI includes a visual identifier, the UAV may position itself over the selected candidate DLI and descend until an image of the candidate DLI can be obtained that includes a sufficient amount of detail of the candidate DLI to determine if the visual identifier is included on the DLI. Alternatively, or in addition thereto, the camera may be oriented toward the selected candidate DLI and/or the focal length of the camera lens on the UAV may be adjusted.

Figure 10:
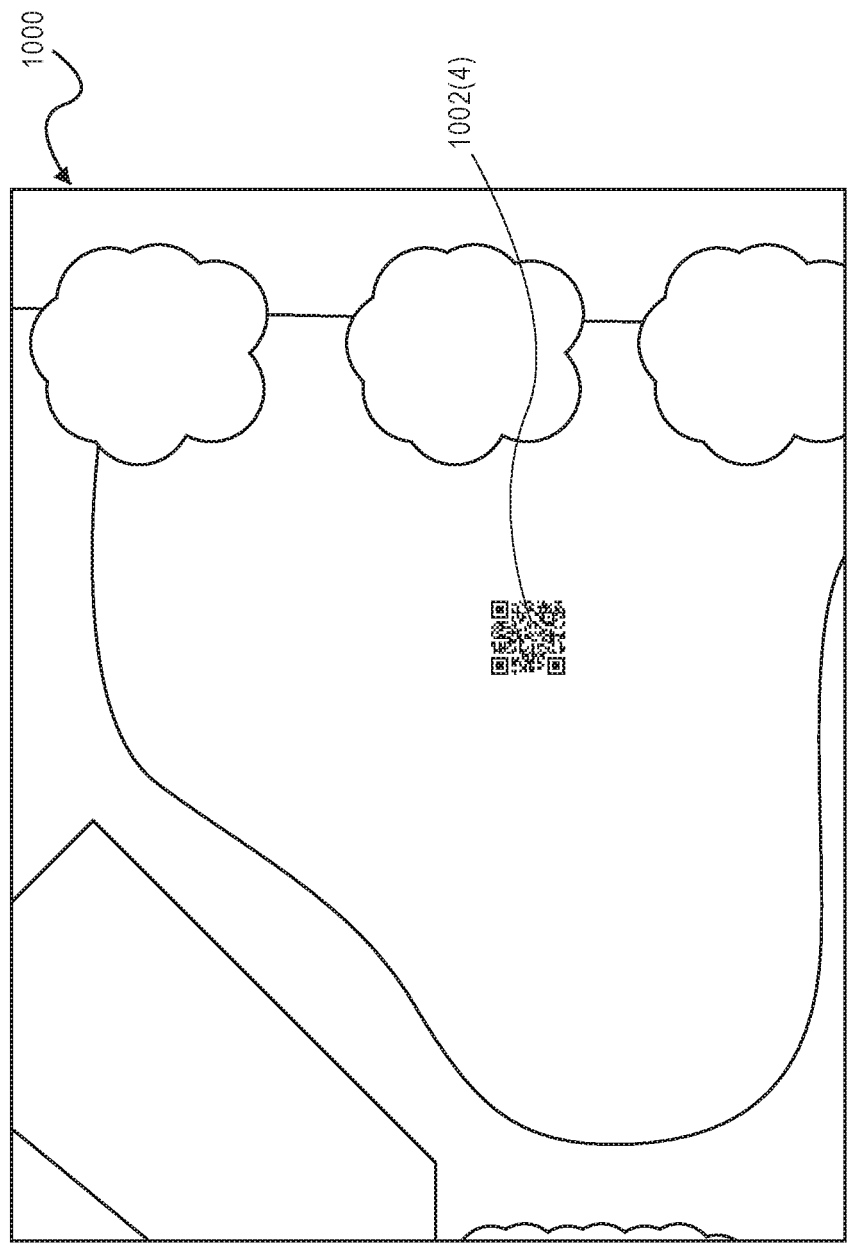
FIG. 10 depicts a diagram of a top-down view of an image of a delivery destination including a candidate delivery location identifier, according to an implementation.

Referring to FIG. 10, the candidate DLI 904(4) (FIG. 9) has been selected for attempted verification. The UAV may position itself over a candidate DLI and descend and/or adjust the focal length of the camera until an image 1000 that includes the candidate DLI 1004(4) is obtained that includes sufficient details of the candidate DLI to determine if the candidate DLI includes the visual identifier of the DLI. In this example, the DLI is known to include a visual identifier in the form of a black and white QR code printed on the surface of the DLI. It may further be known that the QR code is unique to at least one of the user, the order, and/or the delivery destination. When an image 1000 is captured that includes the candidate DLI 1004(4), the image is processed to determine if the candidate DLI 1004(4) includes the visual identifier, and in this example, to confirm that the visual identifier (QR code) corresponds to the unique QR code associated with at least one of the user, the order and/or the delivery destination.

In other implementations, the candidate DLI may be interrogated using other techniques other than or in addition to image analysis to attempt to verify the candidate DLI as the DLI. For example, if the DLI includes a RFID tag, an RFID reader on the UAV may be activated and the UAV may descend until it is within range of the candidate DLI to determine if a RFID tag is included in the candidate DLI. For example, if the RFID tag included in the DLI is a passive RFID tag, the UAV may descent to within a defined distance (e.g., 3 meters) necessary for the RFID tag to be energized by the RFID reader to transmit an RFID tag identifier. If the UAV comes within the defined distance and an RFID tag identifier is not received, it may be determined that the candidate DLI is not the DLI. In comparison, if a RFID tag identifier is received, it may be determined if the received RFID tag identifier corresponds with the identifier associated with the DLI. If the RFID tag identifier and the DLI identifier math, the DLI may be verified. As still another example, if the DLI includes an audio transducer, the UAV may position itself within a defined distance necessary to determine if the candidate DLI is emitting a sound identifier. Likewise, if the DLI emits a light or light pattern, the UAV may position itself over a candidate DLI at a determined position to determine whether the candidate DLI is emitting a light or light pattern.

After attempting to verify a candidate DLI, a determination is made as to whether the selected candidate DLI was verified as the DLI, as in 816. If it is determined that the candidate DLI was verified as the DLI, the delivery location of the verified DLI is determined and returned, as in 818. For example, the geographic coordinates and altitude of the UAV are known when the UAV obtains either an image that includes the candidate DLIs and/or the image that is obtained to verify the DLI. Based on the known coordinates and altitude of the UAV, the coordinates of the objects included in the image can also be determined.

If it is determined that the candidate DLI was not verified as the DLI, a determination is made as to whether additional candidate DLIs remain for verification, as in 820. If it is determined that candidate DLIs remain, the example sub-process returns to block 812 and continues. However, if it is determined that no candidate DLIs remain for attempted verification, a determination is made as to whether a request is to be provided to the user requesting that the user provide DLI input, as in 822. If it is determined that a request for DLI input is to be sent to the user, the example sub-process 800 returns to block 806 and continues. However, if it is determined that a request for DLI input is not to be sent to the user, the item delivery is aborted, as in 824. Alternatively, as discussed above, an agent of the materials handling facility may be notified and the agent may control the UAV to complete the delivery of the item to the delivery destination.

Figure 12:
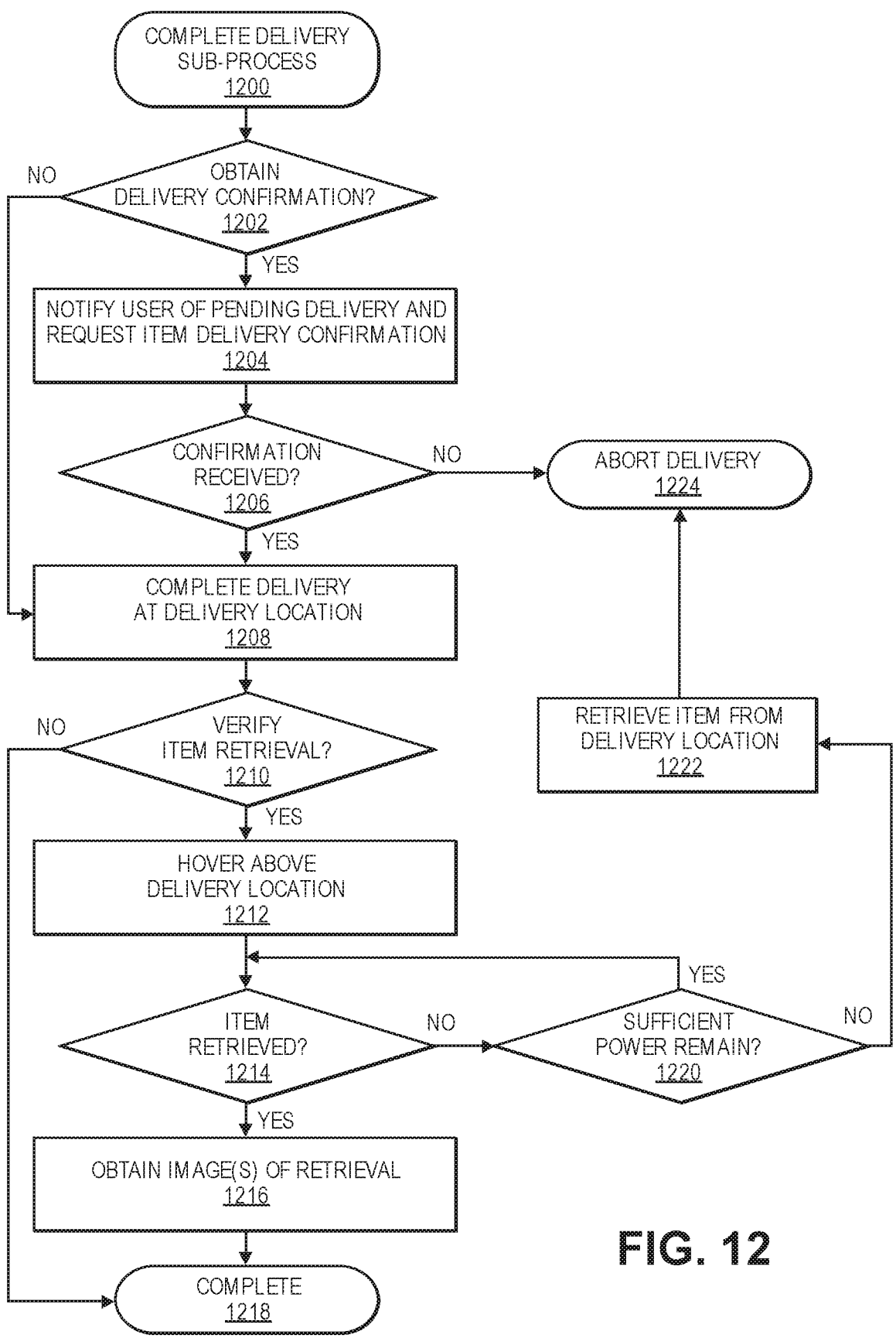
FIG. 12 is a flow diagram illustrating an example sub-process for completing a delivery of an item, according to an implementation.

FIG. 12 is a flow diagram illustrating an example sub-process 1200 for completing an item delivery, according to an implementation. The complete delivery sub-process 1200 begins by determining if a delivery confirmation is to be obtained as part of the delivery, as in 1202. For example, as part of the order and/or based on user specified preferences, it may be determined that a delivery confirmation is to be obtained confirming that the user is available to retrieve the item once delivered.

If it is determined that a delivery confirmation is to be obtained, the user is notified of the pending delivery and a request that the user provide a delivery confirmation to confirm the item delivery is provided, as in 1204. In some implementations, the delivery confirmation request may be included as part of the delivery notification provided to the user in the example process 700 (FIG. 7). The delivery confirmation may be electronic, visual, audible, etc. For example, the delivery confirmation request may be emailed to the user, sent via a short-message-system (SMS), etc. and the user may provide delivery confirmation in a similar manner. Alternatively, if visual confirmation is to be provided, the user may move to a location (e.g., outside) that is within a field of view of a camera of the UAV so that the user can be visually identified. As another example, the user may position their phone or other portable device so that it can be viewed or detected (e.g., via wireless communication) by the UAV. As the UAV arrives at the delivery location, the UAV may identify the portable device, an image presented on the display of the portable device and/or another output from the portable device (e.g., wireless message that includes a unique identifier, audible output, beacon). As another example, the user may receive a telephone call in which an audible delivery confirmation is provided by the user.

A determination is also made as to whether a confirmation has been received, as in 1206. If a delivery confirmation is not received, the delivery is aborted and the UAV may be instructed to navigate to a defined location (e.g., materials handling facility) without delivering the item, as in 1224.

If delivery confirmation is received, or if it was determined at decision block 1202 that delivery confirmation was not to be obtained prior to delivery of the item, delivery of the item at the determined delivery location is completed, as in 1208. For example, the UAV may land at the determined delivery location and disengage the item to be delivered or a container that contains the item to be delivered. In another implementation, the item or a container that contains the item may be lowered from the UAV to the delivery location and released or retrieved by the user. For example, the UAV may remain at a defined altitude that is out of reach of any humans or ground based animals and lower a container that includes the item using a retractable cable, arm, or other mechanism. The container may be placed on the surface at the delivery location and released. Alternatively, the user may retrieve the item from the container and then the UAV may retract the container back up to the UAV. In still another example, the inventory may be engaged by an inventory engagement mechanism that is lowered to the delivery location and the inventory released from the inventory engagement mechanism. The inventory engagement mechanism may then be retracted back up to the UAV.

In some implementations, one or more images of the item positioned at the delivery location (or as it is being retrieved by the user) may be obtained as confirmation that the item has been delivered. For example, a time-stamped and/or location stamped image of the item at the delivery location may be obtained as part of the delivery.

In addition to completing the delivery of the item at the delivery location, a determination is made as to whether item retrieval is to be verified, as in 1210. If it is determined that item retrieval is to be verified, the UAV may continue or return to hovering above the delivery location or generally above or within visual sight of the delivery location, as in 1212. As the UAV hovers, a determination is made as to whether the item has been retrieved, as in 1214. For example, images of the delivery location may continually be processed to determine if the item has been retrieved from the delivery location. In another example, if the item is to be retrieved from a container placed at the delivery location or that is extended down from the UAV, item retrieval may be determined based on interaction with the container. For example, the container may be configured with a power supply and a transmitter that transmits a signal to the UAV when the container is opened.

If it is determined that the item has not been retrieved, a determination is made as to whether the UAV has sufficient power remaining to return to a defined location, as in 1220. If it is determined that the power of the UAV has reached a defined threshold necessary for the UAV to safely return to a defined location, the item is retrieved from the delivery location, or retracted back up to the UAV, as in 1222, and the item delivery is aborted, as in 1224.

If it is determined that the item has been retrieved, one or more images, which may be time-stamped and/or location-stamped, of the user retrieving the item may be obtained and stored by the UAV management system as delivery verification, as in 1218. Likewise, the container may be retrieved from the delivery location and/or the container retracted back up to the UAV. Finally, upon delivery verification or if it is determined at decision block 1210 that delivery verification is not to be obtained, the example sub-process 1200 completes, as in 1218.

Figure 13:
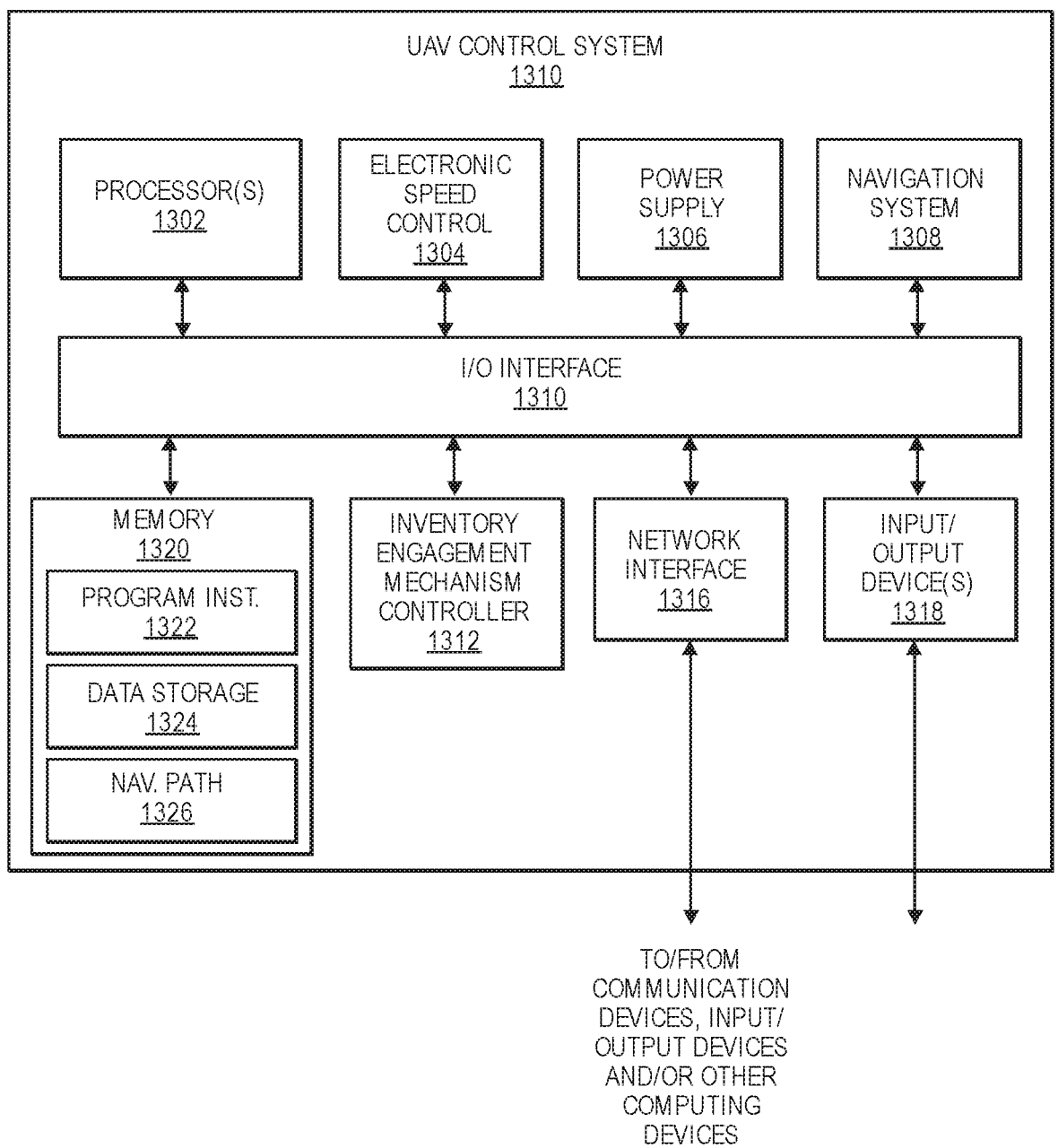
FIG. 13 is a block diagram illustrating various components of an unmanned aerial vehicle control system, according to an implementation.

FIG. 13 is a block diagram illustrating an example UAV control system 310 of the UAV 300. In various examples, the block diagram may be illustrative of one or more aspects of the UAV control system 310 that may be used to implement the various systems and methods discussed above. In the illustrated implementation, the UAV control system 310 includes one or more processors 1302, coupled to a non-transitory computer readable storage medium 1320 via an input/output (I/O) interface 1310. The UAV control system 310 may also include a propeller motor controller 1304, such as an electronic speed control (ESC), a power module 1306, and/or a navigation system 1308. The UAV control system 310 further includes an inventory engagement mechanism controller 1312, a network interface 1316, and one or more input/output devices 1318.

In various implementations, the UAV control system 310 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, navigation paths, and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1320 as program instructions 1322, data storage 1324 and navigation path data 1326, respectively. In other implementations, program instructions, data, and/or navigation paths may be received, sent, or stored upon different types of computer-accessible media, such as non-transitory media, or on similar media separate from the non-transitory computer readable storage medium 1320 or the UAV control system 310. Generally speaking, a non-transitory, computer readable storage medium may include storage media or memory media such as magnetic or optical media, e.g., disk or CD/DVD-ROM, coupled to the UAV control system 310 via the I/O interface 1310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface 1310 or other peripheral interfaces, such as input/output devices 1318. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Additionally, in some implementations, some or all of the functionality of the I/O interface 1310, such as an interface to the non-transitory computer readable storage medium 1320, may be incorporated directly into the processor(s) 1302.

The propeller motor(s) controller 1304 communicates with the navigation system 1308 and adjusts the power of each propeller motor to guide the UAV along a determined navigation path to a delivery destination. The navigation system 1308 may include a GPS or other similar system than can be used to navigate the UAV to and/or from a delivery location. The inventory engagement mechanism controller 1312 communicates with the motor(s) (e.g., a servo motor) used to engage and/or disengage inventory. For example, when the UAV is positioned over a delivery location, the inventory engagement mechanism controller 1312 may provide an instruction to a motor that controls the inventory engagement mechanism to release the inventory.

The network interface 1316 may be configured to allow data to be exchanged between the UAV control system 310, other devices attached to a network, such as other computer systems, and/or with UAV control systems of other UAVs. For example, the network interface 1316 may enable wireless communication between numerous UAVs that are transporting inventory to various delivery destinations. In various implementations, the network interface 1316 may support communication via wireless general data networks, such as a Wi-Fi network. For example, the network interface 1316 may support communication via telecommunications networks such as cellular communication networks, satellite networks, and the like.

Input/output devices 1318 may, in some implementations, include one or more displays, image capture devices (e.g. camera), thermal sensors, infrared sensors, time of flight sensors, accelerometers, pressure sensors, weather sensors, RFID reader, microphone, etc. Multiple input/output devices 1318 may be present and controlled by the UAV control system 310. One or more of these sensors may be utilized to assist in the landing as well as avoid obstacles during delivery and/or engagement of inventory. For example, utilizing a location signal from the GPS receiver and one or more IR sensors, the UAV may safely land at a user specified delivery location. The IR sensors may be used to provide real-time data to assist the UAV in avoiding moving/movable obstacles.

As shown in FIG. 13, the memory 1320 may include program instructions 1322 that may be configured to implement the example processes and/or sub-processes described above. The data storage 1324 may include various data stores for maintaining data items that may be provided for determining navigation paths, retrieving inventory, landing, identifying a delivery destination and/or delivery location within a delivery destination, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 310 is merely illustrative and is not intended to limit the scope of the present disclosure. The UAV control system 310 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 310 may be transmitted to the UAV control system 310 via transmission media or signals such as electrical, electromagnetic, or digital signals, conveyed via a communication medium such as a wireless network. Various implementations may further include receiving, sending, or storing instructions and/or data implemented in accordance with the foregoing description upon a computer-accessible medium. Accordingly, the techniques described herein may be practiced with other UAV control system configurations.

Figure 14:
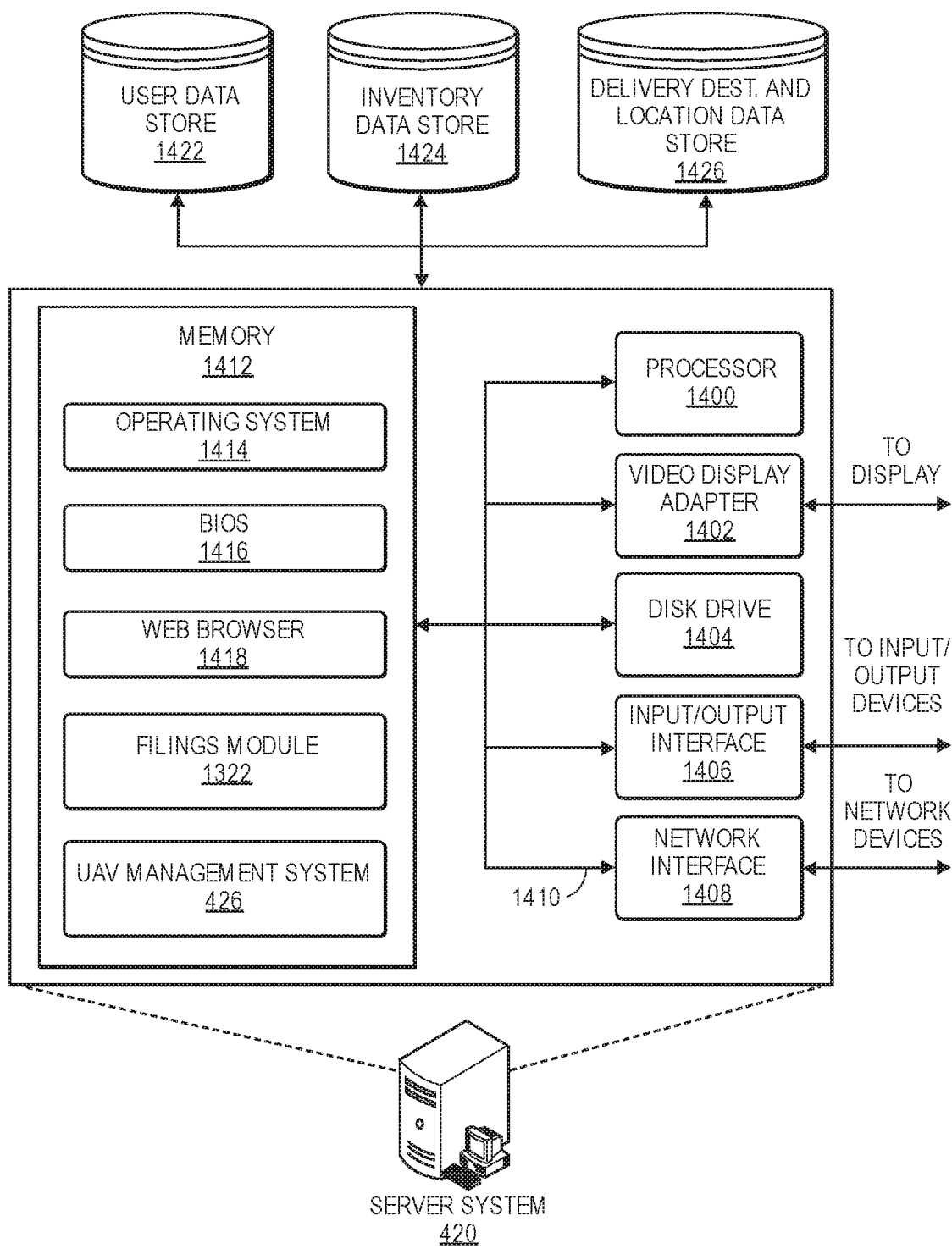
FIG. 14 is a block diagram of an illustrative implementation of a server system that may be used with various implementations.

FIG. 14 is a pictorial diagram of an illustrative implementation of a server system, such as the server system 420, which may be used in the implementations described herein. The server system 420 may include a processor 1400, such as one or more redundant processors, a video display adapter 1402, a disk drive 1404, an input/output interface 1406, a network interface 1408, and a memory 1412. The processor 1400, the video display adapter 1402, the disk drive 1404, the input/output interface 1406, the network interface 1408, and the memory 1412 may be communicatively coupled to each other by a communication bus 1410.

The video display adapter 1402 provides display signals to a local display (not shown in FIG. 14) permitting an operator of the server system 420 to monitor and configure operation of the server system 420. The input/output interface 1406 likewise communicates with external input/output devices not shown in FIG. 14, such as a mouse, keyboard, scanner, or other input and output devices that can be operated by an operator of the server system 420. The network interface 1408 includes hardware, software, or any combination thereof, to communicate with other computing devices. For example, the network interface 1408 may be configured to provide communications between the server system 420 and other computing devices, such as a UAV, materials handling facility, and/or relay location, as shown in FIG. 4.

The memory 1412 generally comprises random access memory (RAM), read-only memory (ROM), flash memory, and/or other volatile or permanent memory. The memory 1412 is shown storing an operating system 1414 for controlling the operation of the server system 420. A binary input/output system (BIOS) 1416 for controlling the low-level operation of the server system 420 is also stored in the memory 1412.

The memory 1412 additionally stores program code and data for providing network services to the UAV management system 426. Accordingly, the memory 1412 may store a browser application 1418. The browser application 1418 comprises computer executable instructions that, when executed by the processor 1400, generate or otherwise obtain configurable markup documents such as Web pages. The browser application 1418 communicates with a data store manager application 1420 to facilitate data exchange between the inventory data store 1422, the user data store 1424, and/or the delivery destination and delivery location data store 1426, and/or other data stores.

As used herein, the term "data store" refers to any device or combination of devices capable of storing, accessing, and retrieving data, which may include any combination and number of data servers, databases, data storage devices and data storage media, in any standard, distributed or clustered environment. The server system 420 can include any appropriate hardware and software for integrating with the data stores 1422-1426 as needed to execute aspects of one or more applications for the UAV management system, UAVs, materials handling facilities, and/or relay locations The data stores 1422-1426 can include several separate data tables, databases or other data storage mechanisms and media for storing data relating to a particular aspect. For example, the data stores 1422-1426 illustrated include mechanisms for inventory information, container information, UAV information, user information, weather information, route information, source location information, delivery destination and/or delivery location information, etc., which can be used to generate and deliver information to the UAV management system 426, materials handling facilities, UAVs, relay locations, and/or users.

It should be understood that there might be many other aspects that may be stored in the data stores 1422-1426. The data stores 1422-1426 are operable, through logic associated therewith, to receive instructions from the server system 420 and obtain, update or otherwise process data in response thereto.

The memory 1412 may also include the UAV management system 426, discussed above. The UAV management system 426 may be executable by the processor 1400 to implement one or more of the functions of the server system 420. In one implementation, the UAV management system 426 may represent instructions embodied in one or more software programs stored in the memory 1412. In another implementation, the UAV management system 426 can represent hardware, software instructions, or a combination thereof.

The server system 420, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction in FIG. 14 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system for delivery of an item by an aerial vehicle, comprising:
    a delivery location identifier positioned at a delivery location, the delivery location indicating a location within a delivery destination at which the item is to be delivered by the aerial vehicle;
    a computing resource communicatively coupled with the aerial vehicle, the computing resource providing the aerial vehicle with information corresponding to the delivery location identifier;
    the aerial vehicle including:
    a navigation system;
        an input component;
        at least one processor;
        a memory; and
        program instructions stored in the memory, wherein the program instructions, when executed by the at least one processor, cause the at least one processor to at least:
            navigate the aerial vehicle, based at least in part on information received from the navigation system, to the delivery destination;
            process data produced by the input component when the aerial vehicle is above the delivery destination to detect a plurality of candidate delivery location identifiers within the delivery destination, individual ones of the plurality of candidate delivery location identifiers including at least one of a size, a shape, or a color associated with the delivery location identifier;
            rank the plurality of candidate delivery location identifiers based on at least one factor;
            verify a candidate delivery location identifier as the delivery location identifier based at least in part on a ranking of the plurality of candidate delivery location identifiers;
            in response to a determination of a position of the delivery location identifier, navigate the aerial vehicle toward the position of the delivery location identifier; and
            complete a delivery of the item at the delivery location.

2. The system of claim 1, wherein the delivery location identifier is detectable by the aerial vehicle.

3. The system of claim 2, wherein:
    the delivery location identifier may be presented in any light spectrum.

4. The system of claim 1, wherein the delivery location identifier is a visual identifier and includes at least one of a quick response (QR) code, a barcode, a bokode, a character, a symbol, the color, the shape, the size, or a light pattern.

5. The system of claim 1, wherein the delivery location identifier is a unique identifier.

6. The system of claim 1, wherein the input component is at least one of a camera, a thermal sensor, an infrared sensor, or a time of flight sensor.

7. The system of claim 1, wherein the input component provides data to the program instructions to assist in delivery of the item.

8. The system of claim 1, wherein the program instructions further cause the at least one processor to at least:
    receive an input provided by a portable device of a user, the input indicating the position of the delivery location identifier within the delivery destination.

9. The system of claim 1, wherein:
    the delivery location identifier is associated with at least one of a user that ordered the item, an order for the item, or the delivery destination; and
    the association is maintained in a data store accessible to at least one of the computing resource, the aerial vehicle, or the program instructions.

10. The system of claim 9, wherein the information provided by the computing resource includes at least one of an indication of the delivery location identifier, or positioning information corresponding to at least one of the delivery destination or the delivery location.

11. The system of claim 1, wherein the program instructions that cause the at least one processor to verify a candidate delivery location identifier as the delivery location identifier based at least in part on a ranking of the plurality of candidate delivery location identifiers, further include instructions that cause the at least one processor to at least:
    confirm that the candidate delivery location identifier corresponds to the information received corresponding to the delivery location identifier from the computing resource.

12. A method for delivery of an item by an aerial vehicle, the method comprising:
    providing a delivery location identifier for placement at a position within a delivery destination;
    navigating the aerial vehicle, based at least in part on information received from a navigation system of the aerial vehicle, to the delivery destination;
    obtaining data corresponding to the delivery destination with an input component of the aerial vehicle;
    processing the data to detect a plurality of candidate delivery location identifiers within the delivery destination, individual ones of the plurality of candidate delivery location identifiers including at least one of a size, shape, or color associated with the delivery location identifier;
    ranking the plurality of candidate delivery location identifiers based on at least one factor;
    verifying a candidate delivery location identifier as the delivery location identifier based at least in part on a ranking of the plurality of candidate delivery location identifiers;
    in response to verifying the delivery location identifier, navigating the aerial vehicle toward a position of the delivery location identifier; and
    completing a delivery of the item.

13. The method of claim 12, wherein:
    the delivery location identifier is unique; and
    the delivery location identifier is detectable by the aerial vehicle and is a visual identifier.

14. The method of claim 12, further comprising:
receiving at the aerial vehicle and from a computing resource, delivery location identifier information corresponding to the delivery location identifier.

15. The method of claim 12, wherein the input component is at least one of a camera, a thermal sensor, an infrared sensor, or a time of flight sensor.

16. The method of claim 12, wherein location information corresponding to the position is received from a portable device.

17. The method of claim 12, wherein position information corresponding to the delivery destination is provided by a portable device associated with a user.

18. The method of claim 12, wherein the delivery location identifier is generated based at least in part on one or more of a user, an order for the item, or the delivery destination.

19. The method of claim 12, wherein the delivery location identifier is associated with a user profile and maintained in a data store.

20. The method of claim 14, wherein the delivery location identifier information is provided in electronic form.

21. The method of claim 12, wherein completing the delivery of the item includes:
obtaining a delivery confirmation.

22. The method of claim 21, wherein the delivery confirmation is at least one of electronic, visual, or audible.

23. The method of claim 12, further comprising:
subsequent to completing delivery of the item, verifying a retrieval of the item.

24. The method of claim 23, wherein verifying a retrieval of the item is based at least in part on verifying that the item has been physically retrieved.

25. The method of claim 12, wherein ranking the plurality of candidate delivery location identifiers based on at least one factor further comprises:
ranking the plurality of candidate delivery location identifiers for verification based on at least one of the size, shape, or color of the delivery location identifier.

26. The method of claim 12, wherein ranking the plurality of candidate delivery location identifiers based on at least one factor further comprises:
ranking the plurality of candidate delivery location identifiers for verification based on a location associated with a prior delivery to the delivery location identifier.

27. The method of claim 12, wherein ranking the plurality of candidate delivery location identifiers based on at least one factor further comprises:
ranking the plurality of candidate delivery location identifiers for verification based on location information corresponding to the position of the delivery location identifier provided by a portable device associated with a user.

28. The method of claim 12, wherein ranking the plurality of candidate delivery location identifiers based on at least one factor further comprises:
ranking the plurality of candidate delivery location identifiers for verification based on proximity of one or more other objects to respective ones of the plurality of candidate delivery location identifiers.

29. A system for delivery of an item by a vehicle, comprising:
a delivery location identifier positioned at a delivery location, the delivery location indicating a location within a delivery destination at which the item is to be delivered by the vehicle;
a computing resource communicatively coupled with the vehicle, the computing resource providing the vehicle with information corresponding to the delivery location identifier;
the vehicle including:
a navigation system;
an input component;
at least one processor;
a memory; and
program instructions stored in the memory, wherein the program instructions, when executed by the at least one processor, cause the at least one processor to at least:
navigate the vehicle, based at least in part on information received from the navigation system, to the delivery destination;
detect, based at least in part on information produced by the input component, a plurality of candidate delivery location identifiers within the delivery destination, individual ones of the plurality of candidate delivery location identifiers including at least one of a size, shape, or color associated with the delivery location identifier;
rank the plurality of candidate delivery location identifiers based on at least one factor;
verify a candidate delivery location identifier as the delivery location identifier based at least in part on a ranking of the plurality of candidate delivery location identifiers; and
in response to a determination of a position of the delivery location identifier, navigate the vehicle to the delivery location identifier.

30. The system of claim 29, wherein:
the delivery location identifier is unique;
the delivery location identifier is detectable by the vehicle; and
the delivery location identifier is a visual identifier.

31. The system of claim 29, wherein the navigation system is a global positioning system.

32. The system of claim 29, wherein the computing resource includes a portable device that provides position information corresponding to a position of the portable device.

33. The system of claim 29, wherein the information provided by the computing resource includes an indication of the delivery location identifier and a location of the delivery destination.

34. The system of claim 29, wherein:
a portion of the delivery location identifier is sent in electronic form to a user; and
the user prints a physical representation of the portion of the delivery location identifier.

35. The system of claim 29, wherein the delivery location identifier is a physical object sent, by a management system, to a user for placement of the delivery location identifier at the location.

* * * * *